(12) United States Patent
Matsuzaki et al.

(10) Patent No.: US 12,537,070 B2
(45) Date of Patent: Jan. 27, 2026

(54) MEMORY DEVICE

(71) Applicant: Semiconductor Energy Laboratory Co., Ltd., Kanagawa-ken (JP)

(72) Inventors: Takanori Matsuzaki, Kanagawa (JP); Tatsuya Onuki, Kanagawa (JP); Takeshi Aoki, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 65 days.

(21) Appl. No.: 18/026,654

(22) PCT Filed: Sep. 8, 2021

(86) PCT No.: PCT/IB2021/058146
§ 371 (c)(1),
(2) Date: Mar. 16, 2023

(87) PCT Pub. No.: WO2022/064302
PCT Pub. Date: Mar. 31, 2022

(65) Prior Publication Data
US 2024/0029812 A1    Jan. 25, 2024

(30) Foreign Application Priority Data

Sep. 22, 2020  (JP) ................................. 2020-158033

(51) Int. Cl.
*G11C 29/44*  (2006.01)
*G06F 12/02*  (2006.01)

(52) U.S. Cl.
CPC .......... *G11C 29/44* (2013.01); *G06F 12/0246* (2013.01); *G06F 2212/2022* (2013.01)

(58) Field of Classification Search
None
See application file for complete search history.

(56) References Cited

U.S. PATENT DOCUMENTS 7,936,004 B2   5/2011  Kito et al.
8,429,494 B2   4/2013  Nakanishi et al.
(Continued)

FOREIGN PATENT DOCUMENTS

JP   02-185789 A       7/1990
JP   2005316793 A  *  11/2005
(Continued)

OTHER PUBLICATIONS

International Search Report (Application No. PCT/IB2021/058146), dated Nov. 9, 2021.
(Continued)

*Primary Examiner* — Mark D Featherstone
*Assistant Examiner* — Matthew W Wahlin
(74) *Attorney, Agent, or Firm* — Husch Blackwell LLP

(57) ABSTRACT

A highly reliable memory device is provided. The memory device includes a memory control unit that includes an input/output unit, a control unit, and a first management unit and a memory unit that includes a plurality of memory blocks. The first management unit includes a plurality of first memory elements, the control unit has a function of converting an address input through the input/output unit to an address of the memory block corresponding to the address, with use of a first management table retained in the plurality of first memory elements, and the first memory elements each include a ferroelectric. The control portion may include a function of not using a defective memory cell and may have a function of performing error correction of readout data.

7 Claims, 15 Drawing Sheets

(56) References Cited

U.S. PATENT DOCUMENTS

| | | | |
|---|---|---|---|
| 8,482,001 | B2 | 7/2013 | Yamazaki et al. |
| 8,551,838 | B2 | 10/2013 | Kito et al. |
| 8,896,042 | B2 | 11/2014 | Yamazaki et al. |
| 9,064,735 | B2 | 6/2015 | Kito et al. |
| 9,748,260 | B2 | 8/2017 | Kito et al. |
| 10,096,619 | B2 | 10/2018 | Ino et al. |
| 10,211,219 | B2 | 2/2019 | Kito et al. |
| 10,916,559 | B2 | 2/2021 | Kito et al. |
| 10,936,410 | B2 | 3/2021 | Tsutsui |
| 11,362,106 | B2 | 6/2022 | Kito et al. |
| 11,374,021 | B2 | 6/2022 | Kito et al. |
| 2003/0230773 | A1* | 12/2003 | Horii ................. H01L 29/516 257/295 |
| 2011/0035646 | A1 | 2/2011 | Nakanishi et al. |
| 2017/0337149 | A1* | 11/2017 | Onuki ................... G06F 13/40 |
| 2018/0373313 | A1* | 12/2018 | Hasbun .............. G06F 13/1684 |
| 2022/0271168 | A1 | 8/2022 | Yamazaki et al. |
| 2022/0302166 | A1 | 9/2022 | Kito et al. |
| 2022/0328517 | A1 | 10/2022 | Kito et al. |

FOREIGN PATENT DOCUMENTS

| | | | | |
|---|---|---|---|---|
| JP | 2007-266143 A | | 10/2007 | |
| JP | 2011039585 A | * | 2/2011 | .......... G06F 11/1068 |
| JP | 2016-224932 A | | 12/2016 | |
| WO | WO-2015/141626 | | 9/2015 | |
| WO | WO-2019111525 A1 | * | 6/2019 | ........... G11C 11/221 |

OTHER PUBLICATIONS

Written Opinion (Application No. PCT/IB2021/058146), dated Nov. 9, 2021.

Boscke, T.S. et al, "Ferroelectricity in Hafnium Oxide Thin Films," Applied Physics Letters, Sep. 8, 2011, vol. 99, No. 10, pp. 102903-1-102903-3.

\* cited by examiner ic structure) and a method for multiplying memory cells.
MEMORY DEVICE This application is a 371 of international application PCT/IB2021/058146 filed on Sep. 8, 2021 which is incorporated herein by reference.

TECHNICAL FIELD

The present invention relates to a semiconductor device.

In this specification and the like, a semiconductor device refers to a device that utilizes semiconductor characteristics, and means a circuit including a semiconductor element (e.g., a transistor, a diode, or a photodiode), a device including the circuit, or the like. The semiconductor device also means all devices that can function by utilizing semiconductor characteristics. For example, an integrated circuit, a chip including an integrated circuit, and an electronic component having a chip put in a package are examples of the semiconductor device. A memory device, a display device, a light-emitting device, a lighting device, an electronic device, and the like are examples of a semiconductor device. Therefore, a semiconductor device includes a semiconductor device in part thereof in some cases.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter.

Examples of the technical field of one embodiment of the present invention include a display device, a light-emitting device, a power memory device, an imaging device, a memory device, a signal processing device, a processor, an electronic device, a system, a driving method thereof, a manufacturing method thereof, and an inspecting method thereof.

BACKGROUND ART

In addition, the amount of data processed in electronic devices has been increased, so that the increase in memory capacity of memory devices has been demanded. Examples of methods for increasing the memory capacity of memory devices include a method for using a structure in which a plurality of memory cell arrays are stacked (three-dimensional structure) and a method for multiplying memory cells.

Furthermore, as a memory device having high memory capacity, a NAND-type flash memory is widely used. In recent years, techniques of increasing the integration degree of NAND-type flash memories by three-dimensional placement of memory cells have become widespread (Patent Document 1).

As described in Non-Patent Document 1, a memory array using a ferroelectric has been actively developed.

REFERENCE

Patent Document

[Patent Document 1] Japanese Published Patent Application No. 2007-266143

Non-Patent Document

[Non-Patent Document 1] T. S. Boescke, et al., "Ferroelectricity in hafnium oxide thin films", APL99, 2011

SUMMARY OF THE INVENTION

Problems to be Solved by the Invention

When the number of memory cells (memory elements) is increased to increase the memory capacity of memory devices, the number of defective memory cells may be increased relatively. When memory cells are multiplied for a similar purpose, the range of holding potentials showing information is narrowed, so that there might be a difference between written data and read data because of the influence of variation in electrical characteristics of elements.

Therefore, just in case the number of defective memory cells is increased, it is necessary to form a system that manages the defective memory cells and performs error check and correct (ECC) processing.

An object of one embodiment of the present invention is to provide a novel memory device. An object of one embodiment of the present invention is to provide a highly reliable memory device. An object of one embodiment of the present invention is to provide a memory device with low power consumption. An object of one embodiment of the present invention is to provide a memory device with high memory capacity. An object of one embodiment of the present invention is to provide a novel semiconductor device. An object of one embodiment of the present invention is to provide a highly reliable semiconductor device. An object of one embodiment of the present invention is to provide a semiconductor device with low power consumption. An object of one embodiment of the present invention is to provide a semiconductor device having high memory capacity.

Note that the objects of one embodiment of the present invention are not limited to the objects listed above. The objects listed above do not preclude the existence of other objects. The objects that are not described in this section will be derived from the description of the specification, the drawings, and the like and can be extracted as appropriate from the description by those skilled in the art. Note that one embodiment of the present invention achieves at least one of the objects listed above and the other objects. Note that one embodiment of the present invention does not necessarily achieve all the objects listed above and the other objects.

Means for Solving the Problems

One embodiment of the present invention is a memory device including a memory control unit including an input/output unit, a control unit, and a first management unit and a memory unit including a plurality of memory blocks. The first management unit includes a plurality of first memory elements, the control unit has a function of converting an address input through the input/output unit to an address of the memory block corresponding to the address, with use of a first management table retained in the plurality of first memory elements, and each of the plurality of first memory elements includes a ferroelectric.

The memory control unit may include a second management unit. The second management unit includes a plurality of second memory elements. The control unit may have a function of selecting a memory block in which data can be written, from the plurality of memory blocks, with use of a second management table retained in the plurality of second memory elements. Each of the plurality of second memory elements may include a ferroelectric.

The memory control unit may include a third management unit. The third management unit includes a plurality of third memory elements. The control unit may have a function of determining whether error correction is necessary or not at the time of reading out data, with use of a third management table retained in the plurality of third memory elements. Each of the plurality of third memory elements may include a ferroelectric.

Each of the plurality of memory blocks includes a plurality of memory elements. The memory elements may be NAND-type memory elements. The ferroelectric preferably includes one or both of hafnium and zirconium. The concentration of hydrogen in the ferroelectric is preferably $5 \times 10^{20}$ atoms/cm$^3$ or lower. The concentration of carbon in the ferroelectric is preferably $5 \times 10^{19}$ atoms/cm$^3$ or lower.

Effect of the Invention

One embodiment of the present invention can provide a novel memory device. According to one embodiment of the present invention, it is an object to provide a highly reliable memory device. One embodiment of the present invention can provide a memory device with lower power consumption. One embodiment of the present invention can provide a memory device with high memory capacity. According to one embodiment of the present invention, it is an object is to provide a novel semiconductor device. One embodiment of the present invention can provide a highly reliable semiconductor device. One embodiment of the present invention can provide a semiconductor device with low power consumption. One embodiment of the present invention can provide a semiconductor device having high memory capacity.

Note that the description of these effects does not preclude the existence of other effects. One embodiment of the present invention does not have to have all of these effects. Effects other than these will be apparent from the description of the specification, the drawings, the claims, and the like and effects other than these can be derived from the description of the specification, the drawings, the claims, and the like.

MODE FOR CARRYING OUT THE INVENTION

Figure 1:
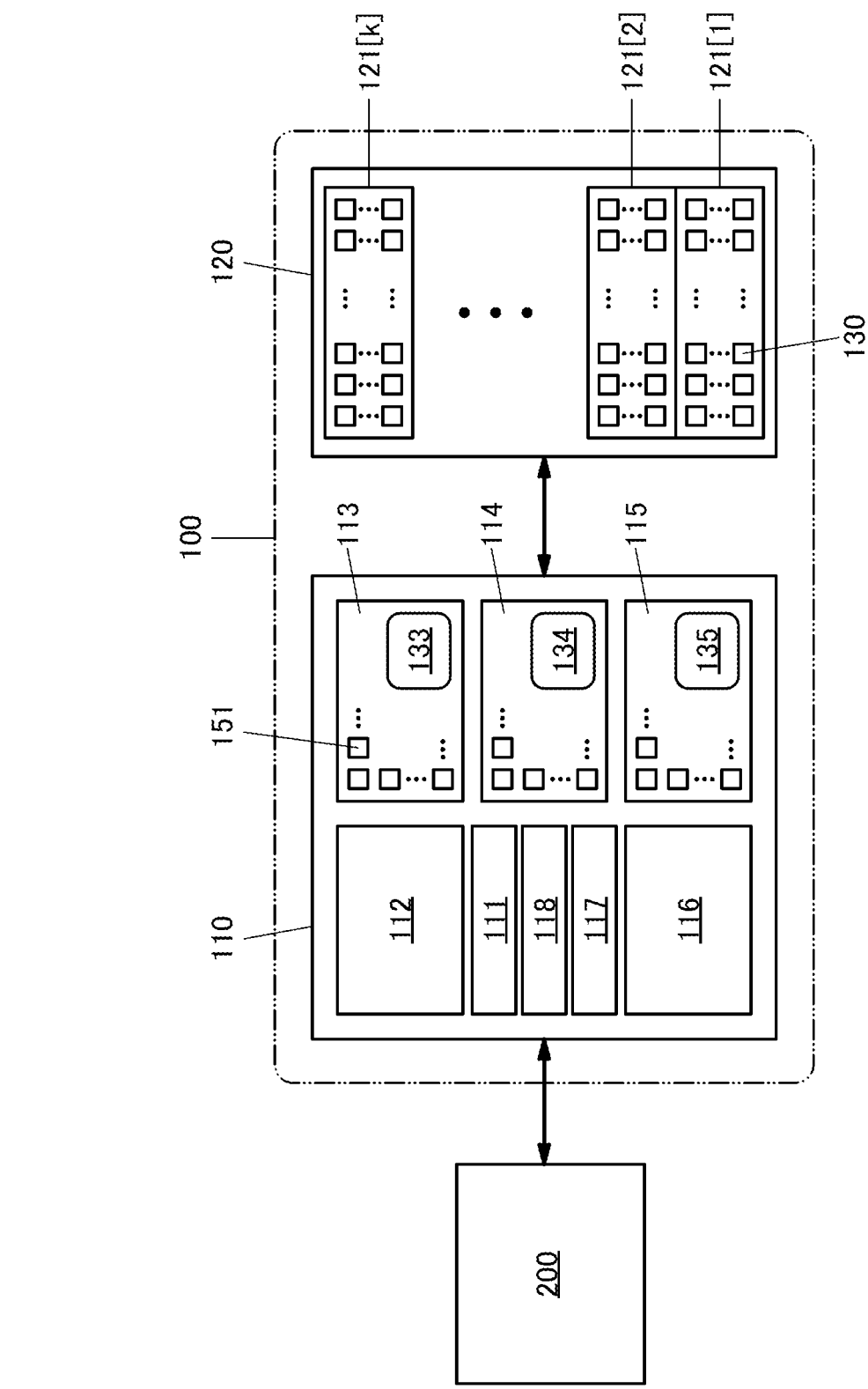
FIG. 1 is a block diagram illustrating a structure example of a memory device.

Furthermore, in the case where this specification and the like state that X and Y are connected, the case where X and Y are electrically connected, the case where X and Y are functionally connected, and the case where X and Y are directly connected are regarded as being disclosed in this specification and the like. Accordingly, without being limited to a predetermined connection relation, for example, a connection relation shown in drawings or text, a connection relation other than that shown in the drawings or the text is regarded as being disclosed in the drawings or the text. Each of X and Y denotes an object (e.g., a device, an element, a circuit, a wiring, an electrode, a terminal, a conductive film, a layer, or the like).

For example, in the case where X and Y are electrically connected, one or more elements that allow electrical connection between X and Y (e.g., a switch, a transistor, a capacitor, an inductor, a resistor, a diode, a display device, a light-emitting device, a load, and the like) can be connected between X and Y. Note that a switch is controlled to be in an on state or an off state. That is, a switch has a function of controlling whether or not current flows by being in a conduction state (on state) or a non-conduction state (off state).

For example, in the case where X and Y are functionally connected, one or more circuits that allow functional connection between X and Y (e.g., a logic circuit (an inverter, a NAND circuit, a NOR circuit, or the like); a signal converter circuit (a digital-analog converter circuit, an analog-digital converter circuit, a gamma correction circuit, or the like); a potential level converter circuit (a power supply circuit (a step-up circuit, a step-down circuit, or the like), a level shifter circuit for changing the potential level of a signal, or the like); a voltage source; a current source; a switching circuit; an amplifier circuit (a circuit that can increase signal amplitude, the amount of current, or the like, an operational amplifier, a differential amplifier circuit, a source follower circuit, a buffer circuit, or the like); a signal generation circuit; a memory circuit; a control circuit; or the like) can be connected between X and Y. Note that for example, even when another circuit is sandwiched between X and Y, X and Y are functionally connected when a signal output from X is transmitted to Y.

Note that an explicit description that X and Y are electrically connected includes the case where X and Y are electrically connected (i.e., the case where X and Y are connected with another element or another circuit sandwiched therebetween) and the case where X and Y are directly connected (i.e., the case where X and Y are connected without another element or another circuit sandwiched therebetween).

In addition, it can be expressed as, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in that order." Alternatively, it can be expressed as "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in that order." Alternatively, it can be expressed as "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided in this connection order." When the connection order in a circuit structure is defined by using an expression method similar to these examples, a source (or a first terminal or the like) and a drain (or a second terminal or the like) of a transistor can be distinguished from each other to specify the technical scope. Note that these expressions are non-limiting examples. Here, each of X and Y denotes an object (e.g., a device, an element, a circuit, a wiring, an electrode, a terminal, a conductive film, a layer, or the like).

Note that even when a circuit diagram shows that independent components are electrically connected to each other, one component has functions of a plurality of components in some cases. For example, when part of a wiring also functions as an electrode, one conductive film has functions of both components: a function of the wiring and a function of the electrode. Thus, electrical connection in this specification also includes such a case where one conductive film has functions of a plurality of components, in its category.

In addition, in this specification and the like, a "resistor" can be a circuit element, a wiring, or the like having a resistance value higher than 0Ω, for example. Therefore, in this specification and the like, a "resistor" includes a wiring having a resistance value, a transistor in which current flows between its source and drain, a diode, a coil, and the like. Thus, the term "resistor" can be replaced with the term such as "resistance," "load," or "region having a resistance value"; conversely, the term "resistance," "load," or "region having a resistance value" can be replaced with the term such as "resistor." The resistance value can be, for example, preferably greater than or equal to 1 mΩ and less than or equal to 10Ω, further preferably greater than or equal to 5 mΩ and less than or equal to 5Ω, still further preferably greater than or equal to 10 mΩ and less than or equal to 1Ω. As another example, the resistance value may be greater than or equal to 1Ω and less than or equal to $1\times10^9$Ω.

In addition, in this specification and the like, a "capacitor" can be, for example, a circuit element having an electrostatic capacitance value higher than 0 F, a region of a wiring having an electrostatic capacitance value higher than 0 F, parasitic capacitance, gate capacitance of a transistor, or the like. Therefore, in this specification and the like, a "capacitor" includes not only a circuit element that has a pair of electrodes and a dielectric between the electrodes, but also parasitic capacitance generated between wirings, gate capacitance generated between a gate and one of a source and a drain of a transistor, and the like. Furthermore, the term such as "capacitor," "parasitic capacitance," or "gate capacitance" can be replaced with the term such as "capacitance"; conversely, the term "capacitance" can be replaced with the term such as "capacitor," "parasitic capacitance," or "gate capacitance." Moreover, the term "pair of electrodes" of "capacitor" can be replaced with "pair of conductors," "pair of conductive regions," "pair of regions," and the like. Note that the electrostatic capacitance value can be greater than or equal to 0.05 fF and less than or equal to 10 pF, for example. As another example, the electrostatic capacitance value may be greater than or equal to 1 pF and less than or equal to 10 µF.

In addition, in this specification and the like, a transistor includes at least three terminals called a gate, a source, and a drain. The gate functions as a control terminal for controlling the conduction state of the transistor. Two terminals functioning as the source and the drain are input/output terminals of the transistor. One of the two input/output terminals serves as the source and the other serves as the drain depending on the conductivity type (n-channel type or p-channel type) of the transistor and the levels of potentials applied to the three terminals of the transistor. Thus, the terms "source" and "drain" can be replaced with each other in this specification and the like. Furthermore, in this specification and the like, expressions "one of a source and a drain" (or a first electrode or a first terminal) and "the other of the source and the drain" (or a second electrode or a second terminal) are used in the description of the connection relation of a transistor.

Note that depending on the transistor structure, a transistor may include a back gate in addition to the above three terminals. In that case, in this specification and the like, one of the gate and the back gate of the transistor is sometimes referred to as a first gate, and the other of the gate and the back gate of the transistor is sometimes referred to as a second gate. Moreover, the terms "gate" and "back gate" can be replaced with each other in one transistor in some cases. In the case where a transistor includes three or more gates, the gates may be sometimes referred to as a first gate, a second gate, and a third gate, for example, in this specification and the like.

In addition, in this specification and the like, "node" can be referred to as a terminal, a wiring, an electrode, a conductive layer, a conductor, an impurity region, or the like depending on a circuit structure, a device structure, or the like. Furthermore, a terminal, a wiring, or the like can be referred to as "node."

In addition, in this specification and the like, "voltage" and "potential" can be replaced with each other as appropriate. The "voltage" refers to a potential difference from a reference potential, and when the reference potential is a ground potential, for example, the "voltage" can be replaced with the "potential." Note that the ground potential does not necessarily mean 0 V. Moreover, potentials are relative values, and a potential applied to a wiring, a potential applied to a circuit or the like, and a potential output from a circuit or the like, for example, are changed with a change of the reference potential.

In addition, in this specification and the like, the terms "high-level potential" (also referred to as "H potential" or "H") and "low-level potential" (also referred to as "L potential" or "L") do not mean a particular potential. For example, in the case where two wirings are both described as "functioning as a wiring for supplying a high-level potential," the high-level potentials applied by these wirings are not necessarily equal to each other. Similarly, in the case where two wirings are both described as "functioning as a wiring for supplying a low-level potential," the low-level potentials applied by these wirings are not necessarily equal to each other.

"Current" is a charge transfer phenomenon (electrical conduction); for example, the description "electrical conduction of positively charged particles occurs" can be rephrased as "electrical conduction of negatively charged particles occurs in an opposite direction." Therefore, unless otherwise specified, "current" in this specification and the like refers to a charge transfer phenomenon (electrical conduction) caused by carrier movement. Examples of a carrier here include an electron, a hole, an anion, a cation, a complex ion, and the like, and the carrier differs between current flow systems (e.g., a semiconductor, a metal, an electrolyte solution, a vacuum, and the like). In addition, "direction of current" in a wiring or the like refers to a direction in which a positive carrier moves, and is expressed as a positive current amount. In other words, a direction in which a negative carrier moves is opposite to the direction of current, and is expressed as a negative current amount. Thus, in the case where the polarity of a current (or the direction of current) is not specified in this specification and the like, the description "current flows from element A to element B" can be rephrased as "current flows from element B to element A," for example. Furthermore, the description "current is input to element A" can be rephrased as "current is output from element A," for example.

In addition, ordinal numbers such as "first," "second," and "third" in this specification and the like are used to avoid confusion among components. Thus, the ordinal numbers do not limit the number of components. Furthermore, the ordinal numbers do not limit the order of components. For example, a "first" component in one embodiment in this specification and the like can be referred to as a "second" component in other embodiments, the scope of claims, or the like. Furthermore, for example, a "first" component in one embodiment in this specification and the like can be omitted in other embodiments, the scope of claims, or the like.

In addition, in this specification and the like, terms for describing positioning, such as "over" and "under," are sometimes used for convenience to describe the positional relation between components with reference to drawings. Furthermore, the positional relation between components is changed as appropriate in accordance with a direction in which each component is described. Thus, the positional relation is not limited to the terms described in the specification and the like, and can be described with another term as appropriate depending on the situation. For example, the expression "an insulator positioned over (on) a top surface of a conductor" can be replaced with the expression "an insulator positioned under (on) a bottom surface of a conductor" when the direction of a drawing showing these components is rotated by 180°.

Furthermore, the term "over" or "under" does not necessarily mean that a component is placed directly above or directly below and in direct contact with another component. For example, the expression "electrode B over insulating layer A" does not necessarily mean that the electrode B is formed over and in direct contact with the insulating layer A, and does not exclude the case where another component is provided between the insulating layer A and the electrode B.

In addition, the term "overlap", for example, in this specification and the like does not limit a state such as the stacking order of components. For example, the expression "electrode B overlapping with insulating layer A" does not necessarily mean the state where "electrode B is formed over insulating layer A", and does not exclude the state where "electrode B is formed under insulating layer A" and the state where "electrode B is formed on the right side (or the left side) of insulating layer A".

The term "adjacent" or "proximity" in this specification and the like does not necessarily mean that a component is directly in contact with another component. For example, the expression "electrode B adjacent to insulating layer A" does not necessarily mean that the electrode B is formed in direct contact with the insulating layer A and does not exclude the case where another component is provided between the insulating layer A and the electrode B.

In addition, in this specification and the like, the terms "film," "layer," and the like can be interchanged with each other depending on the situation. For example, the term "conductive layer" can be changed into the term "conductive film" in some cases. As another example, the term "insulating film" can be changed into the term "insulating layer" in some cases. Alternatively, the term "film," "layer," or the like is not used and can be interchanged with another term depending on the case or the situation. For example, the term "conductive layer" or "conductive film" can be changed into the term "conductor" in some cases. Furthermore, for example, the term "insulating layer" or "insulating film" can be changed into the term "insulator" in some cases.

In addition, in this specification and the like, the term such as "electrode," "wiring," or "terminal" does not limit the function of a component. For example, an "electrode" is used as part of a "wiring" in some cases, and vice versa. Furthermore, the term "electrode" or "wiring" also includes the case where a plurality of "electrodes" or "wirings" are formed in an integrated manner, for example. For example, a "terminal" is used as part of a "wiring" or an "electrode" in some cases, and vice versa. Furthermore, the term "terminal" also includes the case where a plurality of "electrodes," "wirings," "terminals," or the like are formed in an integrated manner, for example. Therefore, for example, an "electrode" can be part of a "wiring" or a "terminal," and a "terminal" can be part of a "wiring" or an "electrode." Moreover, the term such as "electrode," "wiring," or "terminal" is sometimes replaced with the term such as "region."

In addition, in this specification and the like, the term such as "wiring," "signal line," or "power supply line" can be interchanged with each other depending on the case or the situation. For example, the term "wiring" can be changed into the term "signal line" in some cases. Furthermore, for example, the term "wiring" can be changed into the term such as "power source line" in some cases. Conversely, the term such as "signal line" or "power supply line" can be changed into the term "wiring" in some cases. The term such as "power source line" can be changed into the term such as "signal line" in some cases. Conversely, the term such as "signal line" can be changed into the term such as "power source line" in some cases. Moreover, the term "potential" that is applied to a wiring can be sometimes changed into the term such as "signal" depending on the case or the situation. Conversely, the term such as "signal" can be changed into the term "potential" in some cases.

In this specification and the like, an impurity in a semiconductor refers to an element other than a main component of a semiconductor layer, for example. For example, an element with a concentration of lower than 0.1 atomic % is an impurity. When an impurity is contained, for example, the density of defect states in a semiconductor is increased, carrier mobility is decreased, or crystallinity is decreased in some cases. In the case where the semiconductor is an oxide semiconductor, examples of an impurity that changes characteristics of the semiconductor include Group 1 elements, Group 2 elements, Group 13 elements, Group 14 elements, Group 15 elements, and transition metals other than the main components; specifically, there are hydrogen (contained also in water), lithium, sodium, silicon, boron, phosphorus, carbon, nitrogen, and the like, for example. Specifically, in the case where the semiconductor is a silicon layer, examples of an impurity that changes characteristics of the semiconductor include oxygen, Group 1 elements except hydrogen, Group 2 elements, Group 13 elements, Group 15 elements, and the like.

In this specification and the like, a switch has a function of controlling whether current flows or not by being in a conduction state (an on state) or a non-conduction state (an off state). Alternatively, a switch has a function of selecting and changing a current path. For example, an electrical switch, a mechanical switch, or the like can be used. That is, a switch can be any element capable of controlling current, and is not limited to a particular element.

Examples of the electrical switch include a transistor (e.g., a bipolar transistor or a MOS transistor), a diode (e.g., a PN diode, a PIN diode, a Schottky diode, a MIM (Metal Insulator Metal) diode, a MIS (Metal Insulator Semiconductor) diode, or a diode-connected transistor), and a logic circuit in which such elements are combined. Note that in the case where a transistor is used as a switch, a "conduction state" of the transistor refers to a state where a source electrode and a drain electrode of the transistor can be regarded as being electrically short-circuited. Furthermore, a "non-conduction state" of the transistor refers to a state where the source electrode and the drain electrode of the transistor can be regarded as being electrically disconnected. Note that in the case where a transistor operates just as a switch, there is no particular limitation on the polarity (conductivity type) of the transistor.

An example of a mechanical switch is a switch formed using a MEMS (Micro Electro Mechanical Systems) technology. Such a switch includes an electrode that can be moved mechanically, and operates by controlling conduction and non-conduction with movement of the electrode.

In this specification and the like, "parallel" indicates a state where two straight lines are placed at an angle greater than or equal to $-10°$ and less than or equal to $10°$. Accordingly, the case where the angle is greater than or equal to $-5°$ and less than or equal to $5°$ is also included. In addition, "approximately parallel" or "substantially parallel" indicates a state where two straight lines are placed at an angle greater than or equal to $-30°$ and less than or equal to $30°$. In addition, "perpendicular" indicates a state where two straight lines are placed at an angle greater than or equal to $80°$ and less than or equal to $100°$. Accordingly, the case where the angle is greater than or equal to $85°$ and less than or equal to $95°$ is also included. Furthermore, "approximately perpendicular" or "substantially perpendicular" indicates a state where two straight lines are placed at an angle greater than or equal to $60°$ and less than or equal to $120°$.

In this specification and the like, the terms "identical," "the same," "equal," "uniform," and the like used in describing calculation values and measurement values or in describing objects, methods, events, and the like that can be converted into calculation values or measurement values allow for a margin of error of ±20% unless otherwise specified.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in an active layer of a transistor, the metal oxide is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor. In the case where an OS transistor is mentioned, the OS transistor can also be referred to as a transistor including a metal oxide or an oxide semiconductor.

In addition, in this specification and the like, a metal oxide containing nitrogen is also collectively referred to as a metal oxide in some cases. Furthermore, a metal oxide containing nitrogen may be referred to as a metal oxynitride.

In addition, in this specification and the like, one embodiment of the present invention can be constituted by combining, as appropriate, the structure described in each embodiment with the structures described in the other embodiments. Furthermore, in the case where a plurality of structure examples are described in one embodiment, the structure examples can be combined with each other as appropriate.

Note that content (or may be part of the content) described in one embodiment can be applied to, combined with, or replaced with at least one of another content (or may be part of the content) in the embodiment and content (or may be part of the content) described in one or a plurality of different embodiments.

Note that, content described in the embodiment is content described using a variety of diagrams or content described with text described in the specification in each embodiment (or Example).

Note that by combining a drawing (or may be part thereof) described in one embodiment with at least one of another part of the drawing, a different drawing (or may be part thereof) described in the embodiment, and a drawing (or may be part thereof) described in one or a plurality of different embodiments, much more drawings can be constituted.

Embodiments described in this specification are described with reference to the drawings. Note that the embodiments can be implemented in many different modes, and it will be readily understood by those skilled in the art that the modes and details can be changed in various ways without departing from the spirit and scope thereof. Therefore, the present invention should not be construed as being limited to the description in the embodiments. Note that in the structures of the invention in the embodiments, the same reference numerals are used in common for the same portions or portions having similar functions in different drawings, and repeated description thereof is omitted in some cases. Moreover, some components are omitted in a perspective view, a top view, and the like for easy understanding of the diagrams in some cases.

In addition, in the drawings in this specification, the size, the layer thickness, or the region is exaggerated for clarity in some cases. Therefore, embodiments of the present invention are not limited to the size, aspect ratio, and the like shown in the drawings. Note that the drawings schematically show ideal examples, and embodiments of the present invention are not limited to shapes, values, and the like shown in the drawings. For example, variation in signal, voltage, or current due to noise or variation in signal, voltage, or current due to difference in timing can be included.

In this specification and the like, when a plurality of components are denoted with the same reference numerals, and in particular need to be distinguished from each other, an identification sign such as "_1," "[n]," or "[m,n]" is sometimes added to the reference numerals. For example, one of two wirings GL is referred to as a wiring GL[1] and the other is referred to as a wiring GL[2] in some cases.

Embodiment 1

In this embodiment, a structure example, an operation example, and the like of a memory device 100 of one embodiment of the present invention will be described.

<Structure Example of Memory Device>

FIG. 1 is a block diagram illustrating a structure example of a memory device. Although in the block diagram, components are classified by their functions and illustrated as independent blocks, it is difficult to completely divide actual components according to their functions and one component can relate to a plurality of functions.

The memory device 100 has a function of writing data or reading data in response to an access request from a host device 200, such as a CPU (Central Processing Unit), a GPU (Graphics Processing Unit), or a DSP (Digital Signal Processor).

The memory device 100 includes a memory control unit 110 and a memory unit 120. The memory control unit 110 includes an input/output unit 111, a control unit 112, an address management unit 113, a free block management unit 114, an ECC (Error Check and Correct) management unit 115, an ECC processing unit 116, a firmware storage unit 117, and a work memory 118.

The memory unit 120 is a region which the host device 200 can access via the memory control unit 110. Data is written in the memory unit 120 in response to a write request from the host device 200. The data retained in the memory unit 120 is read out in response to a readout request from the host device 200.

The memory unit 120 includes a plurality of memory cells 130. The plurality of memory cells 130 operate in basic units, which are each called "block" or "memory block". The memory capacity of one memory block can be several tens of bits to thousands of bits. FIG. 1 illustrates an example in which the memory unit 120 includes k (k is an integer of 1 or more) memory blocks 121. Note that in FIG. 1, a memory unit 120[1], a memory unit 120[2], and a memory unit 120[k] are illustrated, and a memory unit 120[3] to a memory unit 120[k−1] are not illustrated.

The host device 200 accesses the memory unit 120 on a block basis via the memory control unit 110. In this embodiment and the like, a memory block 121 that stores no data is referred to as a "free block" in some cases.

The memory unit 120 may be configured to be a NOR type or a NAND type. In the case where the memory unit 120 is configured to be a NOR type, a DRAM or an SRAM may be used as the memory cells 130, or an FG (Floating Gate)-type or a MONOS (Metal Oxide Nitride Oxide Semiconductor)-type memory element may be used.

In the case where the memory unit 120 is configured to be a NAND type, the plurality of memory cells 130 may be connected in series. One memory element group in which the plurality of memory cells 130 are connected in series is also referred to as a "memory string". One memory block 121 may include one memory string, or one memory block may include a plurality of memory strings.

Figure 2:
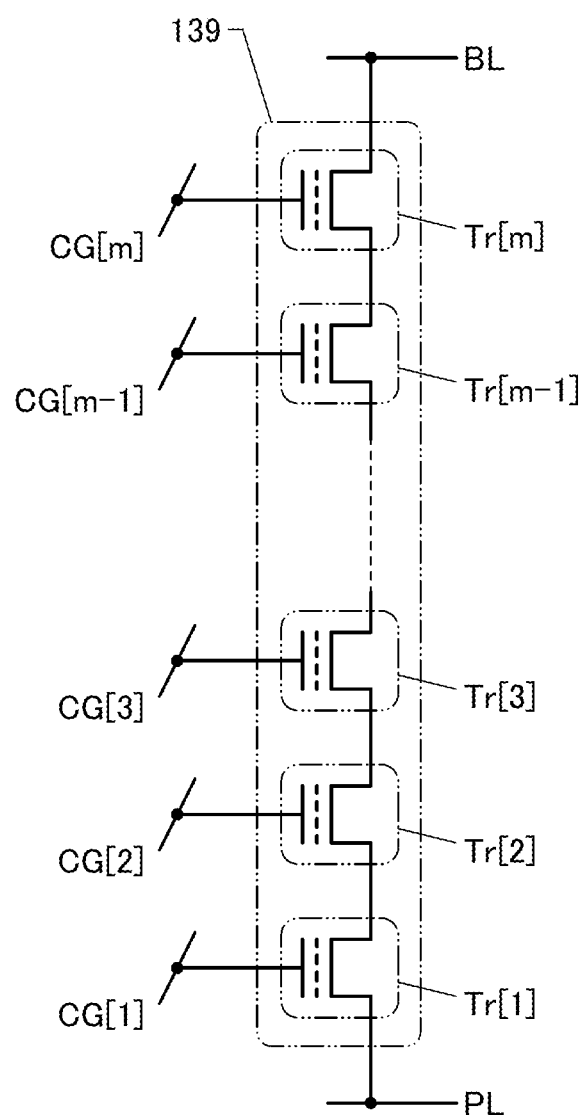
FIG. 2 is a diagram illustrating an example of a circuit structure of a memory string.

FIG. 2 illustrates a circuit structure example of the memory string. A memory string 139 illustrated in FIG. 2 has a structure in which m (m is an integer of 2 or more) transistors Tr are connected in series. A source of a transistor Tr[1] is electrically connected to a wiring PL, and a drain thereof is electrically connected to a source of a transistor Tr[2]. A drain of the transistor Tr[2] is electrically connected to a source of a transistor Tr[3]. A source of a transistor Tr[m] is electrically connected to a drain of a transistor Tr[m-1], and a drain of the transistor Tr[m] is electrically connected to a wiring BL. Gates of the transistor Tr[1] to the transistor Tr[m] are electrically connected to a wiring CG[1] to a wiring CG[m], respectively. The transistors Tr each function as a memory element. The transistors Tr may each be an FG-type memory element or a MONOS-type memory element. Thus, the transistors Tr function as the memory cells 130.

The input/output unit 111 functions as an input/output unit of data and has a function of inputting and outputting data between the memory device 100 and the host device 200. The control unit 112 has a function of controlling the operation of the whole memory device 100 in response to a request from the host device 200.

Figure 3:
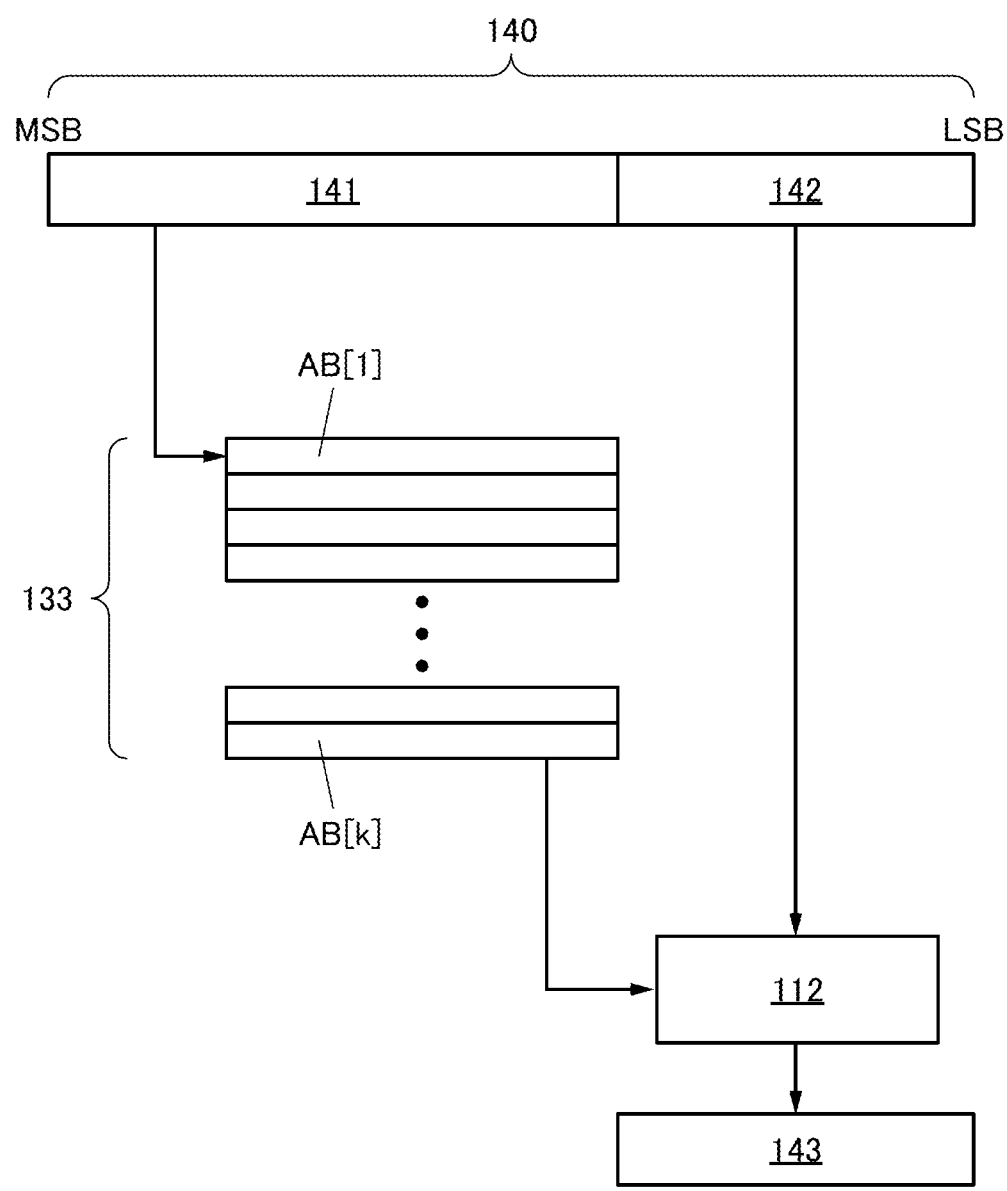
FIG. 3 is a diagram illustrating a logical address conversion table.

The address management unit 113 includes a plurality of memory cells 151 (memory elements) and a logical address conversion table 133 is retained in the plurality of memory cells 151. FIG. 3 illustrates an example of the logical address conversion table 133. The logical address conversion table 133 includes a block AB[1] to a block AB[k]. Information that associates a logical address 140 designated by the host device 200 with a physical address of the memory unit 120 is stored in each of the block AB[1] to the block AB [k].

The logical address 140 includes index information 141 and in-block offset information 142. The index information 141 is stored on an MSB (Most Significant Bit) side of the logical address 140, and the in-block offset information 142 is stored on an LSB (Least Significant Bit) side of the logical address 140.

FIG. 3 illustrates an operation in which information associated with the index information 141 is read from any of the block AB[1] to the block AB[k] and the information and the in-block offset information 142 are input to the control unit 112. Then, the control unit 112 calculates a physical address 143 with use of input information.

Figure 4:
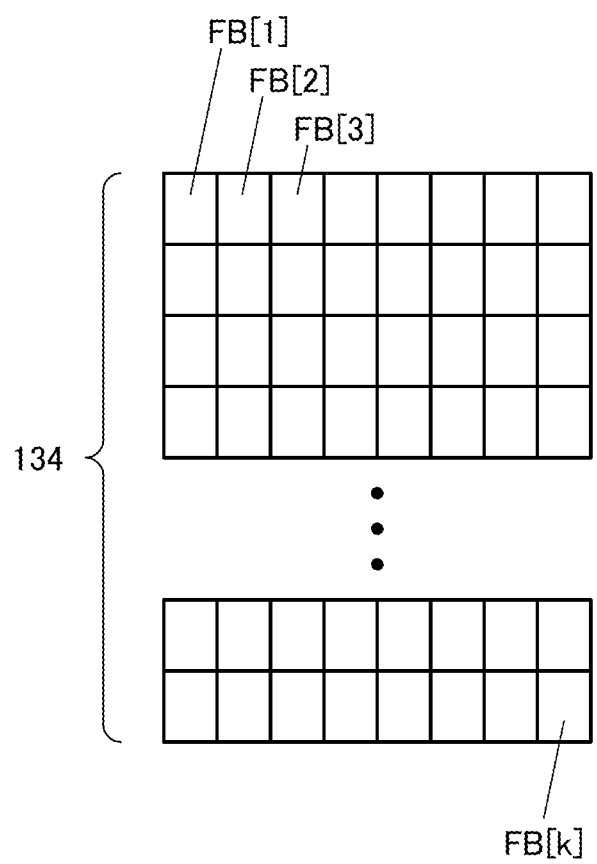
FIG. 4 is a diagram illustrating a free block management table.

The free block management unit 114 includes a plurality of memory cells 151, and a free block management table 134 is retained in the plurality of memory cells 151. FIG. 4 illustrates an example of the free block management table 134. The free block management table 134 includes a block FB [1] to a block FB [k]. The block FB [1] to the block FB[k] store information regarding the usage states of the memory block 121[1] to the memory block 121 [k], respectively, and information regarding the presence or absence of a defective memory cell.

For example, the block FB[1] to the block FB[k] store 3-bit information showing the states of the memory block 121[1] to the memory block 121 [k], respectively.

For example, in the case where the memory block 121[i] (i is an integer greater than or equal to 1 and less than or equal to k) stores no data (is in an unused state), the first bit in the block FB[i] is set to "0", and in the case where the memory block 121[i] stores data (is in a used state), the first bit in the block FB [i] is set to "1".

In the case where a defective memory cell is not included in the memory block 121[i], the second bit of the block FB[i] is set to "0", and in the case where it is found that a defective memory cell is included, the second bit of the block FB[i] is set to "1".

In the case where the memory block 121[i] can be used, the third bit of the block FB[i] is set to "0", and in the case where the memory block 121[i] is disabled from being used, the third bit of the block FB[i] is set to "1".

In searching for a free block, which is described later, only a memory block in which the third bit of the block FB[i] is "0" is a search target. By excluding disabled memory blocks from the memory blocks that are search targets, the search efficiency is improved, leading to shortening the search time and a reduction of power consumption.

Note that the quantity of information that can be stored in one block FB may be 3 bits or more, or may be 2 bits or less.

The control unit 112 determines the usage states of the memory block 121[1] to the memory block 121 [k] on the basis of information stored in the block FB[1] to the block FB[k] in the free block management table 134.

In particular, in the case where FG-type or MONOS-type memory elements are used as the memory cells 130 and data writing is repeatedly performed on the same memory cell 130, the memory cell 130 easily deteriorates to become a defective memory cell. Accordingly, it is preferable to reduce variations in the number of data writing operations among the memory cells 130 and equalize the usage frequency of the memory cells 130. Preferably, data writing is performed preferentially on the memory cell 130 whose number of writing operations is less. By equalizing the usage frequency of the memory cells 130, an increase of defective memory cells is inhibited and the reliability of the memory device 100 can be enhanced.

Figure 5:
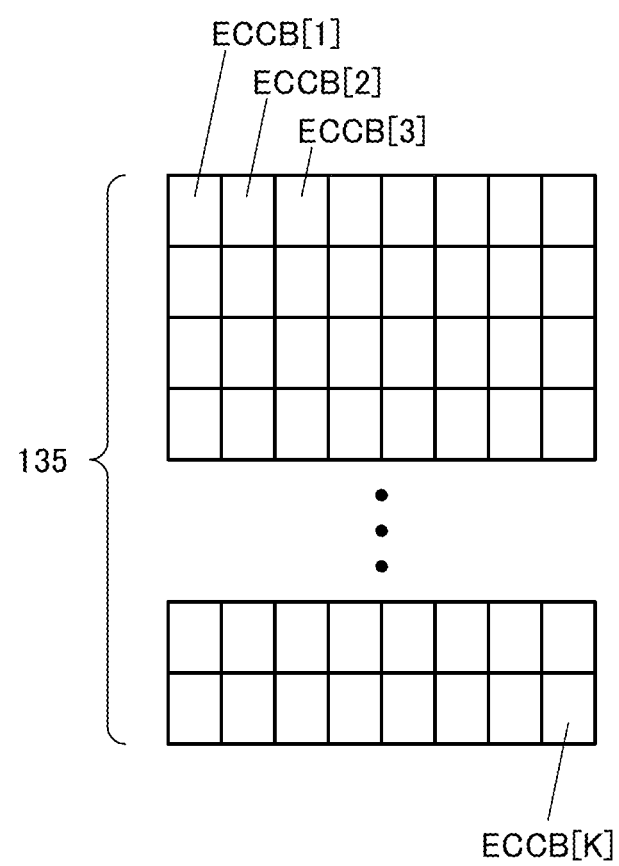
FIG. 5 is a diagram illustrating an ECC management table.

The ECC management unit 115 includes a plurality of memory cells 151, and an ECC management table 135 is retained in the plurality of memory cells 151. FIG. 5 illustrates an example of the ECC management table 135. The ECC management table 135 includes a block ECCB[1] to a block ECCB[k]. The block ECCB[1] to the block ECCB[k] store information regarding error correction of the memory block 121[1] to the memory block 121 [k], respectively. For example, 1-bit information that shows whether or not error correction is needed for the memory block 121[1] to the memory block 121 [k] is stored in the block ECCB[1] to the block ECCB[k]. For example, in the case where error check and correction is not needed for the memory block 121[i], "0" is stored in the block ECCB[i], and in the case where error check and correction is needed for the memory block 121[i], "1" is stored in the block ECCB[i]. Note that 2-bit or more information may be stored in the blocks ECCB.

The control unit 112 determines whether or not error check and correction is needed for the memory block 121[1] to the memory block 121 [k], on the basis of information stored in the block ECCB[1] to the block ECCB[k] in the ECC management table 135.

Note that in this embodiment, one memory block 121 is assigned to one block ECCB but a plurality of memory blocks 121 may be assigned to one block ECCB.

The ECC processing unit 116 has a function of checking and correcting an error of the memory unit 120. For example, the ECC processing unit 116 has a function of correcting an error by a BCH code, a Reed-Solomon code, a CRC (Cyclic Redundancy Check) code, or the like.

The firmware storage unit 117 includes a plurality of memory elements and has a function of storing firmware. The firmware is a program executed to allow the control unit 112 to control the memory device 100. The control unit 112 controls the operation of the entire memory device 100 in accordance with the firmware.

The work memory 118 has a function of temporarily saving data necessary for execution of the firmware by the control unit 112. An SRAM (Static Random Access Memory), a DRAM (Dynamic Random Access Memory), or the like can be used as the work memory 118, for example.

Even in the memory cell 130, the error occurrence rate might become higher because holding time becomes longer due to variation in element electrical characteristics, for example. Consequently, error correction is very effective in improving holding characteristics and reliability of the memory device 100.

Figure 6A:
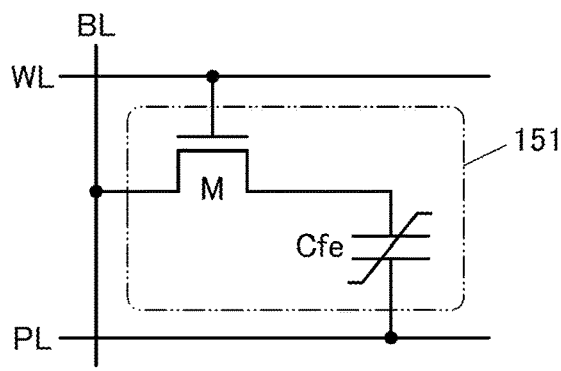
FIG. 6A is a diagram illustrating an example of a circuit structure of a memory cell.

FIG. 6A illustrates a circuit structure example of the memory cell 151 included in each of the address management unit 113, the free block management unit 114, and the ECC management unit 115. The memory cell 151 illustrated in FIG. 6A is a 1Tr1C memory circuit including one transistor M and one capacitor Cfe, and functions as an FeRAM (Ferroelectric Random Access Memory).

A variety of semiconductor materials can be used as a semiconductor layer in which the channel of the transistor M is formed. For example, as the semiconductor layer in which the channel of the transistor M is formed, a single crystal semiconductor, a polycrystalline semiconductor, a microcrystalline semiconductor, an amorphous semiconductor, or the like can be used alone or in combination. As a semiconductor material, silicon, germanium, or the like can be used, for example. Alternatively, a compound semiconductor such as silicon germanium, silicon carbide, gallium arsenide, oxide semiconductor, or nitride semiconductor may be used.

An oxide semiconductor has a band gap of 2 eV or more; thus, a transistor including oxide semiconductor as a semiconductor layer in which a channel is formed (also referred to as an "OS transistor") has an extremely low off-state current. When an OS transistor is used as the transistor M, data written to the memory cell 151 can be held for a long time. In the case where OS transistors are used as transistors included in the memory cell 151, the memory cell 151 can be referred to as an "OS memory".

An OS transistor is preferably used as the transistor M. An OS transistor has a feature of high breakdown voltage. Thus, when the transistor M is an OS transistor, a high voltage can be applied to the transistor M even when the transistor M is miniaturized. The miniaturization of the transistor M can reduce the area occupied by the memory cell 151. For example, the area occupied by one memory cell 151 illustrated in FIG. 6A can be ⅓ to ⅙ of the area occupied by one SRAM cell. Consequently, the memory cells 151 can be arranged at high density. Thus, the memory device of one embodiment of the present invention can be a memory device having high memory capacity.

An oxide semiconductor used for an OS transistor may be a CAAC-OS (c-axis aligned crystalline oxide semiconductor), an nc OS, or an a-like OS.

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement.

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Thus, the orientation in the whole film is not observed. Accordingly, in some cases, the nc-OS cannot be distinguished from an a-like OS or an amorphous oxide semiconductor, depending on an analysis method.

The a-like OS is an oxide semiconductor having a structure between those of the nc-OS and the amorphous oxide semiconductor. The a-like OS includes a void or a low-density region. That is, the a-like OS has lower crystallinity than the nc-OS and the CAAC-OS.

Note that the transistor M may or may not include a back gate in addition to its gate. Although the transistor M is an n-channel transistor in FIG. 6A, the transistor M may be a p-channel transistor.

One of a source and a drain of the transistor M is electrically connected to the wiring BL. The other of the source and the drain of the transistor M is electrically connected to one electrode of the capacitor Cfe. The gate of the transistor M is electrically connected to a wiring WL. The other electrode of the capacitor Cfe is electrically connected to the wiring PL.

The wiring WL has a function of a word line, and the potential of the wiring WL is controlled so that ON/OFF of the transistor M can be controlled. For example, the potential of the wiring WL is set to a high potential so that the transistor M can be turned on, while the potential of the wiring WL is set to a low potential so that the transistor M can be turned off.

The wiring BL has a function of a bit line, and a potential corresponding to the potential of the wiring BL is supplied to one electrode of the capacitor Cfe when the transistor M is in an on state.

The wiring PL has a function of a plate line, and the potential of the wiring PL can be the potential of the other electrode of the capacitor Cfe.

The capacitor Cfe includes a material that can have ferroelectricity as a dielectric layer between the two electrodes. In this specification and the like, a dielectric layer including a material that can have ferroelectricity is referred to as a "ferroelectric layer" in some cases.

As materials that can have ferroelectricity, hafnium oxide, zirconium oxide, $HfZrO_x$ (X is a real number greater than 0), a material in which an element J1 (the element J1 here is zirconium (Zr), silicon (Si), aluminum (Al), gadolinium (Gd), yttrium (Y), lanthanum (La), strontium (Sr), or the like) is added to hafnium oxide, a material in which an element J2 (the element J2 here is hafnium (Hf), silicon (Si), aluminum (Al), gadolinium (Gd), yttrium (Y), lanthanum (La), strontium (Sr), or the like) is added to zirconium oxide, and the like can be given. Furthermore, as a material that can have ferroelectricity, piezoelectric ceramics having a perovskite structure, such as $PbTiO_x$, barium strontium titanate (BST), strontium titanate, lead zirconate titanate (PZT), strontium bismuth tantalate (SBT), bismuth ferrite (BFO), or barium titanate can also be used. As a material that can have ferroelectricity, for example, a mixture or a compound including a plurality of materials selected from the above-listed materials can also be used. Alternatively, the dielectric layer may have a stacked-layer structure of a plurality of materials selected from the above-listed materials.

As the material that can have ferroelectricity, especially, a material containing hafnium oxide or a material containing hafnium oxide and zirconium oxide is preferably used. The material containing hafnium oxide or the material containing hafnium oxide and zirconium oxide is preferred, because such a material can have ferroelectricity when it is processed to be a thin film of several nanometers. The thickness of the dielectric layer can be less than or equal to 100 nm, preferably less than or equal to 50 nm, further preferably less than or equal to 20 nm, still further preferably less than or equal to 10 nm (typically greater than or equal to 2 nm and less than or equal to 9 nm). With use of a thinned dielectric layer, a memory device can be formed with a combination of the capacitor Cfe and a miniaturized transistor.

In the case where $HfZrO_x$ is used as the material that can have ferroelectricity, an atomic layer deposition (ALD) method, especially a thermal ALD method is preferably used for deposition. When the material that can have ferroelectricity is deposited by a thermal ALD method, a material not containing hydrocarbon (also referred to as Hydro Carbon, HC) is preferably used as a precursor. In the case where the material that can have ferroelectricity contains one or both of hydrogen and carbon, crystallization of the material that can have ferroelectricity might be hindered. Thus, it is preferable to reduce the concentration of one or both of hydrogen and carbon in the material that can have ferroelectricity, by using such a precursor not containing hydrocarbon, as described above. Examples of the precursor not containing hydrocarbon include a chlorine-based material. When a material containing hafnium oxide and zirconium oxide ($HfZrO_x$) is used as the material that can have ferroelectricity, $HfCl_4$ and/or $ZrCl_4$ may be used as a precursor.

In the case where a film is formed using the material that can have ferroelectricity, impurities in the film, at least one or more of hydrogen, hydrocarbon, and carbon are eliminated thoroughly, and thereby a high-purity intrinsic film having ferroelectricity can be obtained. Note that the high-purity intrinsic film having ferroelectricity and an oxide semiconductor are highly compatible in their manufacturing processes. Therefore, a method for manufacturing a memory device with high productivity can be provided.

The hydrogen concentration of a material that can have ferroelectricity, measured by secondary ion mass spectrometry (SIMS), is preferably lower than or equal to $5\times10^{20}$ atoms/cm$^3$, further preferably lower than or equal to $1\times10^{20}$ atoms/cm$^3$. The carbon concentration of the material that can have ferroelectricity, measured by SIMS, is preferably lower than or equal to $5\times10^{19}$ atoms/cm$^3$, further preferably lower than or equal to $1\times10^{19}$ atoms/cm$^3$.

In the case where $HfZrO_x$ is used as a material that can have ferroelectricity, it is preferable that hafnium oxide and zirconium oxide be alternately deposited to have the composition of 1:1 by a thermal ALD method.

In the case where the material that can have ferroelectricity is deposited by a thermal ALD method, $H_2O$ or $O_3$ can be used as an oxidizer, for example. Note that the oxidizer for the thermal ALD method is not limited to these materials. As the oxidizer for the thermal ALD method, one or more selected from $O_2$, $O_3$, $N_2O$, $NO_2$, $H_2O$, and $H_2O_2$ may be used.

The crystal structure of the material that can have ferroelectricity is not particularly limited. For example, the crystal structure of the material that can have ferroelectricity may be one or more selected from a cubic crystal system, a tetragonal crystal system, an orthorhombic crystal system, and a monoclinic crystal system. In particular, the material that can have ferroelectricity preferably has an orthorhombic crystal structure because it exhibits ferroelectricity. Alternatively, a composite structure having an amorphous structure and a crystal structure may be used for the material that can have ferroelectricity.

Figure 6B:
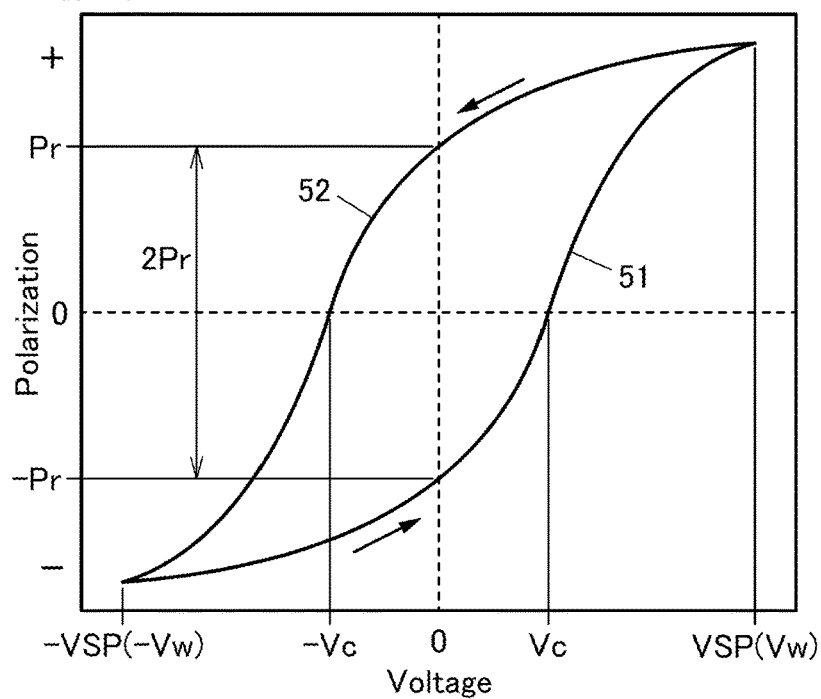
FIG. 6B is a graph showing an example of hysteresis characteristics.

A ferroelectric layer, which is a dielectric layer including the material that can have ferroelectricity, has hysteresis characteristics. FIG. 6B is a graph showing an example of the hysteresis characteristics. In FIG. 6B, the horizontal axis represents a voltage applied to the ferroelectric layer. The voltage can be a difference between the potential of one electrode of the capacitor Cfe and the potential of the other electrode of the capacitor Cfe, for example.

In addition, in FIG. 6B, the vertical axis represents polarization of the ferroelectric layer; a positive value indicates that positive charges are concentrated on one electrode side of the capacitor Cfe and negative charges are concentrated on the other electrode side of the capacitor Cfe. On the other hand, a negative value of the polarization indicates that positive charges are concentrated on the other electrode side of the capacitor Cfe and negative charges are concentrated on the one electrode side of the capacitor Cfe.

Note that the voltage represented by the horizontal axis of the graph in FIG. 6B may be a difference between the potential of the other electrode of the capacitor Cfe and the potential of the one electrode of the capacitor Cfe. Furthermore, the polarization represented by the vertical axis of the graph in FIG. 6B may be a positive value in the case where positive charges are concentrated on the other electrode side of the capacitor Cfe and negative charges are concentrated on the one electrode side of the capacitor Cfe, and may be a negative value in the case where positive charges are concentrated on the one electrode side of the capacitor Cfe and negative charges are concentrated on the other electrode side of the capacitor Cfe.

As shown in FIG. 6B, the hysteresis characteristics of the ferroelectric layer can be represented by a curve 51 and a curve 52. The voltages at the intersecting points between the curve 51 and the curve 52 are VSP and −VSP. The polarities of VSP and −VSP can be said to be different.

A voltage lower than or equal to −VSP is applied to the ferroelectric layer, and the voltage applied to the ferroelectric layer is increased, in which case the polarization quantity of the ferroelectric layer is increased along the curve 51. On the other hand, a voltage higher than or equal to VSP is applied to the ferroelectric layer, and then the voltage applied to the ferroelectric layer is decreased, in which case the polarization quantity of the ferroelectric layer is decreased along the curve 52. Thus, VSP and −VSP can each be referred to as a saturation polarization voltage. Incidentally, VSP is referred to as a first saturation polarization voltage and −VSP is referred to as a second saturation polarization voltage in some cases. In addition, the absolute values of the first saturation polarization voltage and the second saturation polarization voltage are equal to each other in FIG. 6B, but may be different from each other.

Here, Vc represents a voltage applied to the ferroelectric layer in the case where the polarization of the ferroelectric layer is 0 in the change of the polarization of the ferroelectric layer along the curve 51. In addition, −Vc represents a voltage applied to the ferroelectric layer in the case where the polarization of the ferroelectric layer is 0 in the change of the polarization of the ferroelectric layer along the curve 52. Vc and −Vc can be referred to as coercive voltages. The value of Vc and the value of −Vc can be said to be values between −VSP and VSP. For example, Vc is referred to as a first coercive voltage and −Vc is referred to as a second coercive voltage in some cases. Note that the absolute values of the first coercive voltage and the second coercive voltage are equal to each other in FIG. 6B, but may be different from each other.

The maximum value and the minimum value of polarization when a voltage is not applied to the ferroelectric layer are referred to as "remanent polarization Pr" and "remanent polarization −Pr", respectively. A difference between the remanent polarization Pr and the remanent polarization −Pr is referred to as "remanent polarization 2Pr".

As described above, a voltage applied to the ferroelectric layer included in the capacitor Cfe can be expressed by a difference between the potential of one electrode of the capacitor Cfe and the potential of the other electrode of the capacitor Cfe. As described above, the other electrode of the capacitor Cfe is electrically connected to the wiring PL. Thus, by controlling the potential of the wiring PL, the voltage applied to the ferroelectric layer included in the capacitor Cfe can be controlled.

Note that the structure of the memory cell 151 may be used for the memory cell 130.

<Example of Driving Method of Memory Cell>

An example of a driving method of the memory cell 151 in FIG. 6A is described below. In the following description, the voltage applied to the ferroelectric layer of the capacitor Cfe indicates a difference between the potential of one electrode of the capacitor Cfe and the potential of the other electrode of the capacitor Cfe (the wiring PL). In addition, the transistor M is an n-channel transistor.

Figure 6C:
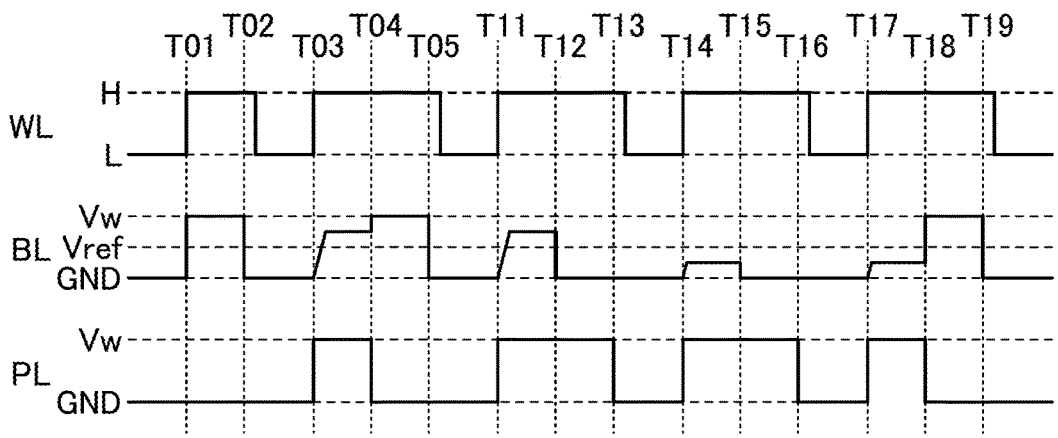
FIG. 6C is a timing chart showing a driving method of a memory cell.

FIG. 6C is a timing chart showing an example of a driving method of the memory cell 151 in FIG. 6A. FIG. 6C illustrates an example of writing and reading 2-bit digital data in and out of the memory cell 151. Specifically, in FIG. 6C, data "1" is written in the memory cell 151 from Time T01 to Time T02; the data "1" is read out and rewritten from Time T03 to Time T05; the data "1" is read out, and data "0" is written in the memory cell 151 from Time T11 to Time T13; the data "0" is read out and rewritten from Time T14 to Time T16; and the data "0" is read out and data "1" is written in the memory cell 151 from Time T17 to Time T19.

A sense amplifier electrically connected to the wiring BL is supplied with Vref as a reference potential. In the readout operation illustrated in FIG. 6C or the like, when the potential of the wiring BL is higher than Vref, data "1" is read out by a bit line driver circuit. In contrast, when the potential of the wiring BL is lower than Vref, data "0" is read out by the bit line driver circuit.

From Time T01 to Time T02, the potential of the wiring WL is set to a high potential. Thus, the transistor M is turned on. In addition, the potential of the wiring BL is set to Vw. Since the transistor M is in an on state, the potential of one electrode of the capacitor Cfe becomes Vw. In addition, the potential of the wiring PL is set to GND. Accordingly, the voltage applied to the ferroelectric layer of the capacitor Cfe becomes "Vw-GND". As a result, (the) data "1" can be written in the memory cell 151. Consequently, the period from Time T01 to Time T02 can be referred to as a write operation period.

Here, Vw is preferably higher than or equal to VSP, and is preferably equal to VSP, for example. GND can be set to, for example, a ground potential, but is not necessarily a ground potential as long as the memory cell 151 can be driven so as to achieve an object of one embodiment of the present invention. For example, when the absolute value of the first saturation polarization voltage is different from the absolute value of the second saturation polarization voltage, and the absolute value of the first coercive voltage is different from the absolute value of the second coercive voltage, GND can be a potential other than a ground.

From Time T02 to Time T03, the potential of the wiring BL and the potential of the wiring PL are set to GND. Accordingly, the voltage applied to the ferroelectric layer of the capacitor Cfe becomes 0 V. The voltage "Vw-GND" applied to the ferroelectric layer of the capacitor Cfe from Time T01 to Time T02 can be higher than or equal to VSP, and thus the polarization quantity of the ferroelectric layer of the capacitor Cfe is changed along the curve 52 in FIG. 6B from Time T02 to Time T03. From the above, from Time T02 to Time T03, polarization inversion does not occur in the ferroelectric layer of the capacitor Cfe.

After the potential of the wiring BL and the potential of the wiring PL are set to GND, the potential of the wiring WL is set to a low potential. Thus, the transistor M is turned off. Through the above steps, the write operation is completed and data "1" is held in the memory cell 151. Note that the potentials of the wiring BL and the wiring PL can be any potentials as long as polarization inversion does not occur in the ferroelectric layer of the capacitor Cfe, i.e., the voltage applied to the ferroelectric layer of the capacitor Cfe is higher than or equal to −Vc as the second coercive voltage.

From Time T03 to Time T04, the potential of the wiring WL is set to a high potential. Thus, the transistor M is turned on. The potential of the wiring PL is set to Vw. By setting the potential of the wiring PL to Vw, the voltage applied to the ferroelectric layer of the capacitor Cfe becomes "GND-Vw". As described above, from Time T01 to Time T02, the voltage applied to the ferroelectric layer of the capacitor Cfe is "Vw-GND". Thus, polarization inversion occurs in the ferroelectric layer of the capacitor Cfe. At the time of the polarization inversion, a current flows through the wiring BL, and the potential of the wiring BL becomes higher than Vref. Thus, the bit line driver circuit can read out the data "1" held in the memory cell 151. Accordingly, the period from Time T03 to Time T04 can be referred to as a readout operation period. Note that Vref is higher than GND and lower than Vw but may be higher than Vw, for example.

Since the above readout is destructive readout, the data "1" held in the memory cell 151 is lost. Thus, from Time T04 to Time T05, the potential of the wiring BL is set to Vw and the potential of the wiring PL is set to GND. Thus, data "1" is rewritten in the memory cell 151. Consequently, the period from Time T04 to Time T05 can be referred to as a rewrite operation period.

From Time T05 to Time T11, the potential of the wiring BL and the potential of the wiring PL are set to GND. After that, the potential of the wiring WL is set to a low potential. Through the above steps, the rewrite operation is completed, and the data "1" is held in the memory cell 151.

From Time T11 to Time T12, the potential of the wiring WL is set to a high potential and the potential of the wiring PL is set to Vw. Since the data "1" is held in the memory cell 151, the potential of the wiring BL becomes higher than Vref and the data "1" held in the memory cell 151 is read out. Accordingly, the period from Time T11 to Time T12 can be referred to as a readout operation period.

From Time T12 to Time T13, the potential of the wiring BL is set to GND. Since the transistor M is in an on state, the potential of one electrode of the capacitor Cfe becomes GND. The potential of the wiring PL is set to Vw. In the above manner, the voltage applied to the ferroelectric layer of the capacitor Cfe becomes to be "GND-Vw". As a result, data "0" can be written in the memory cell 151. Consequently, the period from Time T12 to Time T13 can be referred to as a write operation period.

From Time T13 to Time T14, the potential of the wiring BL and the potential of the wiring PL are set to GND. Accordingly, the voltage applied to the ferroelectric layer of the capacitor Cfe becomes 0 V. The voltage "GND-Vw" applied to the ferroelectric layer of the capacitor Cfe from Time T12 to Time T13 can be set to be −VSP or lower; thus, the polarization quantity of the ferroelectric layer of the capacitor Cfe is changed along the curve 51 in FIG. 6B from Time T13 to Time T14. From the above, from Time T13 to Time T14, polarization inversion does not occur in the ferroelectric layer of the capacitor Cfe.

After the potential of the wiring BL and the potential of the wiring PL are set to GND, the potential of the wiring WL is set to a low potential. Thus, the transistor M is turned off. Through the above steps, the write operation is completed and data "0" is held in the memory cell 151. Note that the potentials of the wiring BL and the wiring PL can be any potentials as long as polarization inversion does not occur in the ferroelectric layer of the capacitor Cfe, i.e., the voltage applied to the ferroelectric layer of the capacitor Cfe is lower than or equal to Vc as the first coercive voltage.

From Time T14 to Time T15, the potential of the wiring WL is set to a high potential. Thus, the transistor M is turned on. The potential of the wiring PL is set to Vw. By setting the potential of the wiring PL to Vw, the voltage applied to the ferroelectric layer of the capacitor Cfe becomes "GND-Vw". As described above, the voltage applied to the capacitor layer of the capacitor Cfe from Time T12 to Time T13 is "GND-Vw". Thus, polarization inversion does not occur in the ferroelectric layer of the capacitor Cfe. Consequently, the amount of current flowing through the wiring BL is smaller than that in the case where the polarization inversion occurs in the ferroelectric layer of the capacitor Cfe. Accordingly, the increase amount in the potential of the wiring BL is smaller than that in the case where the polarization inversion occurs in the ferroelectric layer of the capacitor Cfe; specifically, the potential of the wiring BL becomes lower than or equal to Vref. Thus, the bit line driver circuit can read out the data "0" held in the memory cell 151. Accordingly, the period from Time T14 to Time T15 can be referred to as a readout operation period.

From Time T15 to Time T16, the potential of the wiring BL is set to GND and the potential of the wiring PL is set to Vw. Thus, data "0" is rewritten in the memory cell 151. Accordingly, the period from Time T15 to Time T16 can be referred to as a rewrite operation period.

From Time T16 to Time T17, the potential of the wiring BL and the potential of the wiring PL are set to GND. After that, the potential of the wiring WL is set to a low potential. Through the above steps, the rewrite operation is completed, and the data "0" is held in the memory cell 151.

From Time T17 to Time T18, the potential of the wiring WL is set to a high potential and the potential of the wiring PL is set to Vw. Since the data "0" is held in the memory cell 151, the potential of the wiring BL becomes lower than Vref and the data "0" held in the memory cell 151 is read out. Accordingly, the period from Time T17 to Time T18 can be referred to as a readout operation period.

The potential of the wiring BL is set to Vw from Time T18 to Time T19. Since the transistor M is in an on state, the potential of one electrode of the capacitor Cfe becomes Vw. The potential of the wiring PL is set to GND. Accordingly, the voltage applied to the ferroelectric layer of the capacitor Cfe becomes "Vw-GND". As a result, data "1" can be written in the memory cell 151. Consequently, the period from Time T18 to Time T19 can be referred to as a write operation period.

After Time T19, the potential of the wiring BL and the potential of the wiring PL are set to GND. After that, the potential of the wiring WL is set to a low potential. Through the above steps, the write operation is completed and the data "1" is held in the memory cell 151.

The memory cell 151 including the ferroelectric layer in the capacitor Cfe functions as a nonvolatile memory element that can hold information written therein even when power supply is stopped. Furthermore, when the memory cell 151 is used in the memory device 100, information of the logical address conversion table 133, the free block management table 134, and the ECC management table 135 can be held even when power supply to the memory device 100 is stopped.

Furthermore, when memory regions in which the logical address conversion table 133, the free block management table 134, and the ECC management table 135 are retained are configured using DRAMs, regular refresh operation is needed, leading to an increase of power consumption. The memory regions are each configured using the memory cell 151 using the ferroelectric layer in the capacitor Cfe, whereby the power consumption of the memory device 100 can be reduced.

Figure 7A:
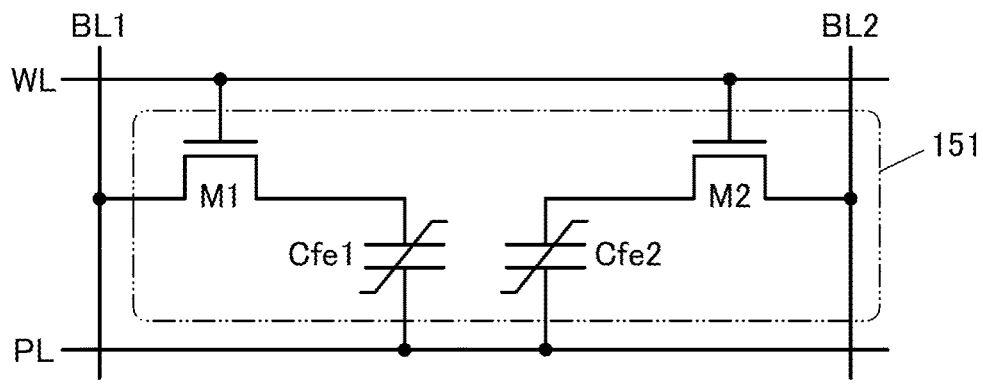
FIG. 7A to FIG. 7E are each a diagram illustrating an example of a circuit structure of a memory cell.

The memory cell 151 may be a 2Tr2C memory circuit that includes two transistors (transistor M1 and transistor M2) and two capacitors (capacitor Cfe1 and capacitor Cfe2) as illustrated in FIG. 7A. In the memory cell 151 illustrated in FIG. 7A, one of a source and a drain of the transistor M1 is electrically connected to a wiring BL1. The other of the source and the drain of the transistor M1 is electrically connected to one electrode of the capacitor Cfe1. One of a source and a drain of the transistor M2 is electrically connected to a wiring BL2. The other of the source and the drain of the transistor M2 is electrically connected to one electrode of the capacitor Cfe2. A gate of the transistor M1 and a gate of the transistor M2 are electrically connected to the wiring WL. The other electrode of the capacitor Cfe1 and the other electrode of the capacitor Cfe2 are electrically connected to the wiring PL. The wiring BL1 and the wiring BL2 each function as a bit line. The memory cell 151 illustrated in FIG. 7A functions as an FeRAM.

Figure 7B:
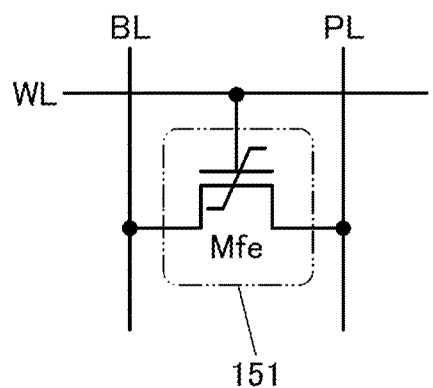

As illustrated in FIG. 7B, an FeFET (Ferroelectric-gate Field-Effect Transistor) may be used as the memory cell 151. A ferroelectric-gate transistor Mfe is a field-effect transistor using a ferroelectric as a gate insulating film. One of a source and a drain of the ferroelectric-gate transistor Mfe is electrically connected to the wiring BL1, the other thereof is electrically connected to the wiring PL, and a gate thereof is electrically connected to the wiring WL.

Figure 7C:
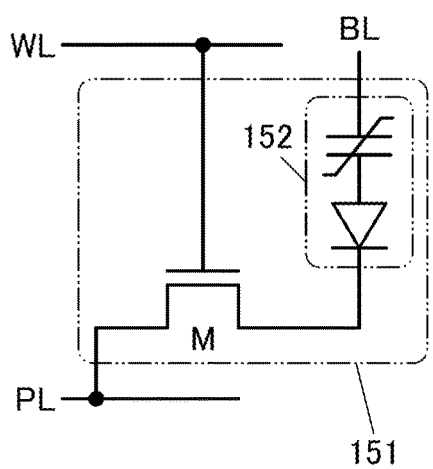

As illustrated in FIG. 7C, the transistor M and an FTJ element 152 (FTJ: Ferroelectric Tunnel Junction or Ferroelectric Transportation Junction) may be used as the memory cell 151. In FIG. 7C, one of the source and the drain of the transistor M is electrically connected to one electrode of the FTJ element 152, the other of the source and the drain thereof is electrically connected to the wiring PL, and the gate thereof is electrically connected to the wiring WL. The other electrode of the FTJ element 152 is electrically connected to the wiring BL.

Figure 7D:
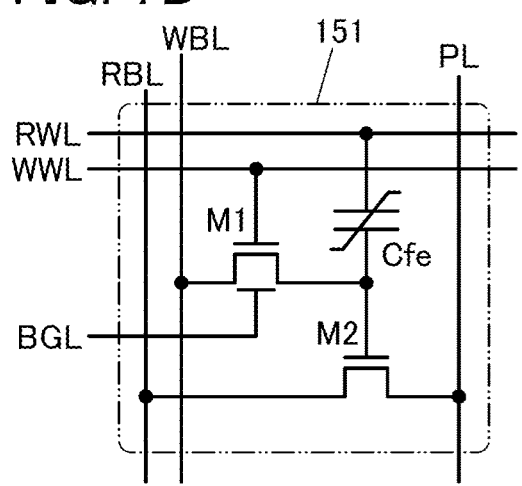

The memory cell 151 may be a 2Tr1C memory circuit including two transistors (transistor M1 and transistor M2) and one capacitor (capacitor Cfe) as illustrated in FIG. 7D. In the memory cell 151 illustrated in FIG. 7D, one of the source and the drain of the transistor M1 is electrically connected to a wiring WBL. The other of the source and the drain of the transistor M1 is electrically connected to one electrode of the capacitor Cfe. The gate of the transistor M1 is electrically connected to a wiring WWL. The transistor M1 illustrated in FIG. 7D is a transistor having a back gate. The back gate of the transistor M1 is electrically connected to a wiring BGL.

One of the source and the drain of the transistor M2 is electrically connected to a wiring RBL. The other of the source and the drain of the transistor M2 is electrically connected to the wiring PL. The gate of the transistor M2 is electrically connected to one electrode of the capacitor Cfe. The other electrode of the capacitor Cfe is electrically connected to a wiring RWL. The wiring WBL and the wiring RBL function as bit lines. The wiring WWL and the wiring RWL function as word lines.

Figure 7E:
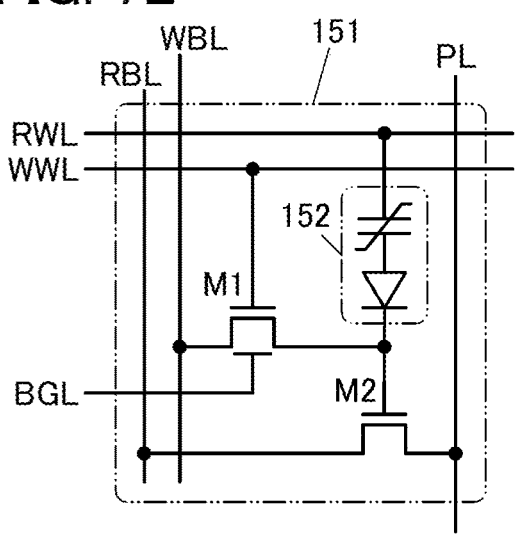

As in the memory cell 151 illustrated in FIG. 7E, the capacitor Cfe of the memory cell 151 in FIG. 7D may be replaced with the FTJ element 152. In the memory cell 151 illustrated in FIG. 7E, one electrode of the FTJ element 152 is electrically connected to the other of the source and the drain of the transistor M1 and the gate of the transistor M2. The other electrode of the FTJ element 152 is electrically connected to the wiring RWL.

In this specification and the like, a memory element including a ferroelectric layer or a memory circuit including a ferroelectric layer is referred to as a "ferroelectric memory" or an "FE memory". Thus, the memory cell 151 is a ferroelectric memory and is also an FE memory. The FE memory can be expected to achieve the number of rewrite cycles of $1 \times 10^{10}$ or more, preferably $1 \times 10^{12}$ or more, further preferably $1 \times 10^{15}$ or more. The FE memory can be expected to achieve an operation frequency of greater than or equal to 10 MHz, preferably greater than or equal to 1 GHz.

In the FE memory, the remanent polarization 2Pr and data holding capability have a correlation, and as the remanent polarization 2Pr becomes smaller, the data holding capability declines. In this specification and the like, a period over which the remanent polarization 2Pr is reduced by 5% (the data holding capability declines by 5%) is referred to as a "memory holding period". The FE memory can be expected to have a memory holding period often days or longer, preferably one year or longer, further preferably ten years or longer at an environmental temperature of 150° C. or 200° C.

The FE memory can also be applied to a cache memory and/or a register in a CPU, a GPU, and the like. An Noff-CPU (Nomaly off CPU) can be obtained by a combination of the FE memory with a cache memory and/or a register in a CPU. An Noff-GPU (Nomaly off GPU) can be obtained by a combination of the FE memory with a cache memory and/or a register in a GPU.

The memory device 100 according to one embodiment of the present invention has a function of determining whether or not error correction by the ECC processing unit 116 is needed, with use of the address management unit 113, the free block management unit 114, and the ECC management unit 115. Consequently, reliability and execution processing speed can be increased and power consumption can be reduced.

<Operation Example of Memory Device>

The operation example of the memory device 100 is described with reference to flow charts in FIG. 8 to FIG. 12.

<<Initialization>>

Figure 8:
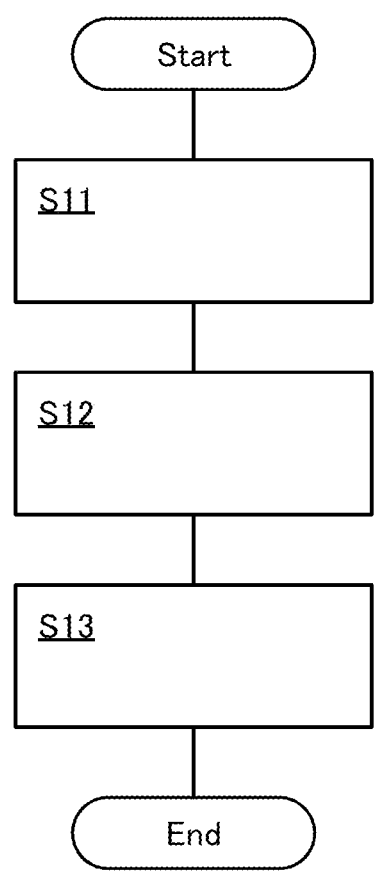
FIG. 8 is a flow chart illustrating an operation example of a memory device.

FIG. 8 is a flow chart explaining an initialization operation performed when power supply to the memory device 100 is started.

[Step S11]

In Step S11, the logical address conversion table 133 is initialized. Specifically, the control unit 112 accesses the address management unit 113 and deletes data in the block AB[1] to the block AB [k] in the logical address conversion table 133.

[Step S12]

In Step S12, the free block management unit 114 is initialized. Specifically, the control unit 112 accesses the free block management unit 114 and writes "0" in the block FB[1] to the block FB[k] in the free block management table 134.

[Step S13]

In Step S13, the ECC management table 135 is initialized. Specifically, the control unit 112 accesses the ECC management unit 115 and writes "0" in the block ECCB[1] to the block ECCB [K] in the ECC management table 135.

Note that the initialization operation of the memory device 100 is not limited to that in the flow chart of FIG. 8. For example, the order of the initialization steps of the logical address conversion table 133, the free block management table 134, and the ECC management table 135 is not limited and may be changed, or the initialization steps may be performed at the same time.

<<Write Operation>>

Figure 9:
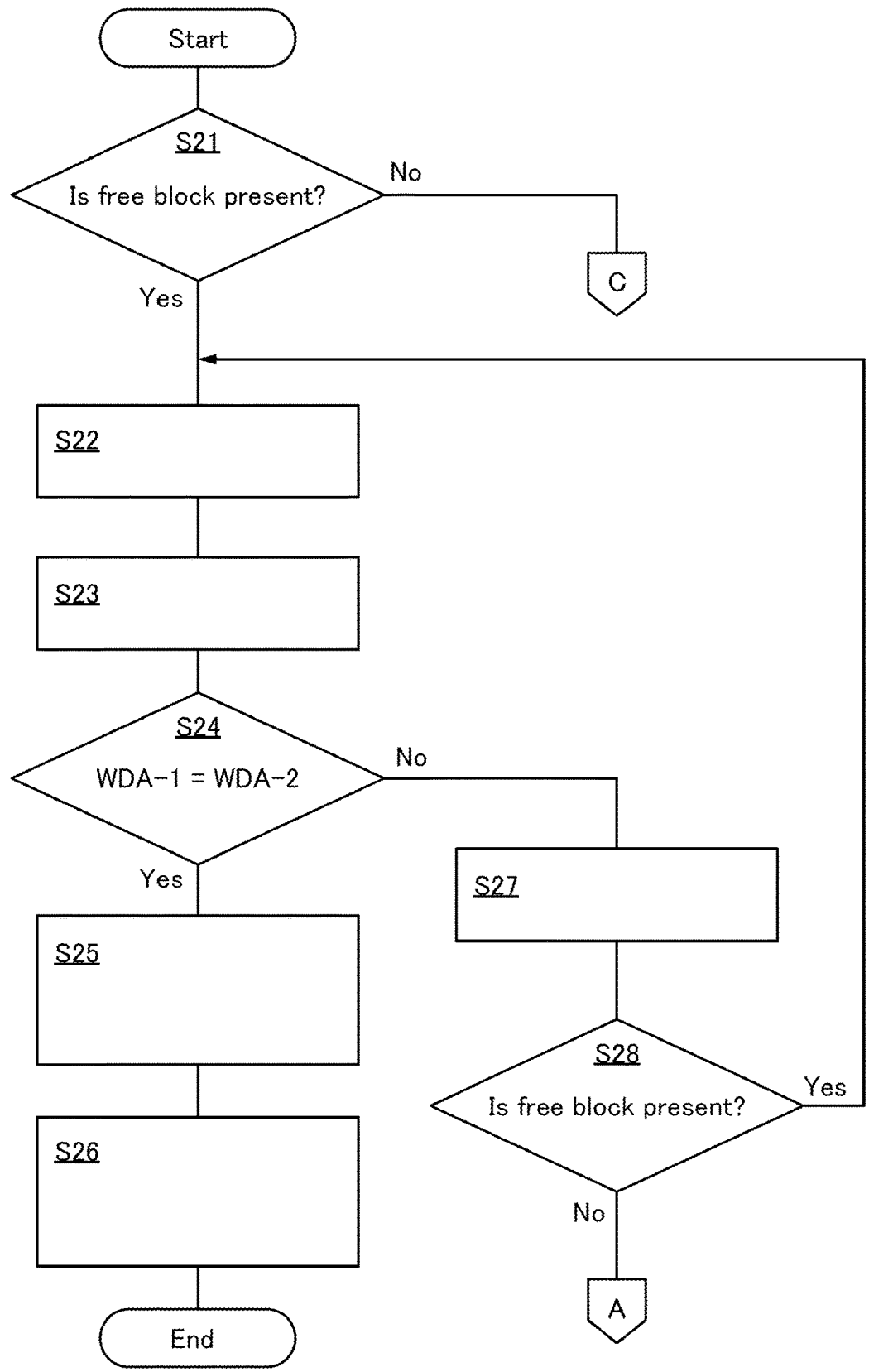
FIG. 9 is a flow chart illustrating an operation example of a memory device.

FIG. 9 is a flow chart illustrating an operation example of the memory device 100 in response to write access of the host device 200. When a data write request to the memory device 100 is made from the host device 200, the control unit 112 performs operations in Step S21 to Step S26. Here, write data transmitted from the host device 200 is referred to as "data WDA-1".

[Step S21]

In Step S21, it is checked whether a memory block 121 that stores no data is present (Yes) or not (No). Specifically, the control unit 112 accesses the free block management unit 114 and searches for a memory block 121 that stores no data (the memory block is also referred to as a "free block"), retained in the free block management table 134. Here, the memory block 121 that does not store data is referred to as a "memory block 121[x]".

When no free block is found, Step S51 (Connector C, see FIG. 11B) is performed. Step S51 is described later.

[Step S22]

When the memory block 121[x] is found, the data WDA-1 is written in the memory block 121[x]. This data written in the memory block 121[x] is referred to as "data WDA-2".

The data WDA-1 that is transmitted from the host device 200 is temporarily written in the work memory 118.

[Step S23]

In Step S23, the data WDA-2 written in Step S22 is read out.

[Step S24]

In Step S24, whether the data WDA-2 read out in Step S23 matches with the data WDA-1 temporarily saved in the work memory 118 (Yes) or not (No) is determined.

When the data WDA-1 matches with the data WDA-2, Step S25 is performed. In Step S24, when the data WDA-1 does not match with the data WDA-2, Step S27 is performed. That the data WDA-1 does not match with the data WDA-2 indicates that a defective memory cell is present in the memory block 121[x].

[Step S25]

In Step S25, the control unit 112 accesses the address management unit 113 and the free block management unit 114 and writes predetermined information in the logical address conversion table 133 and the free block management table 134. Specifically, in the logical address conversion table 133, the index information 141 of the logical address 140 that is transmitted from the host device 200 along with the data WDA-1 is written in a block AB[x] corresponding to the memory block 121[x], and in the free-block management table 134, data "1" is written in the first bit of a block FB[x] corresponding to the memory block 121[x].

[Step S26]

In Step S26, a signal that notifies completion of writing of the data WDA-1 is transmitted to the host device 200 through the input/output unit 111.

[Step S27]

Step S27 is performed when the data WDA-1 does not match with the data WDA-2. That is, Step S27 is performed when a defective memory cell is present in the memory block 121[x]. In Step S27, "1" is written in the second bit of the block FB[x] in the free block management table 134 corresponding to the memory block 121[x].

By storing information showing the presence of a defective memory cell in the block FB of the free block management table 134, the efficiency of searching for a free block can be increased, the operation speed of the memory device 100 can be improved, and the power consumption can be reduced.

[Step S28]

In Step S28, it is checked whether a memory block 121 that stores no data is present (Yes) or not (No), as performed in Step S21. Note that in Step S28, searching of a free block where the presence of a defective memory cell is not found is performed. That is, the control unit 112 accesses the free block management table 134, and searches for a memory block for which the block FB has the first bit of "0" and the second bit of "0".

Figure 10:
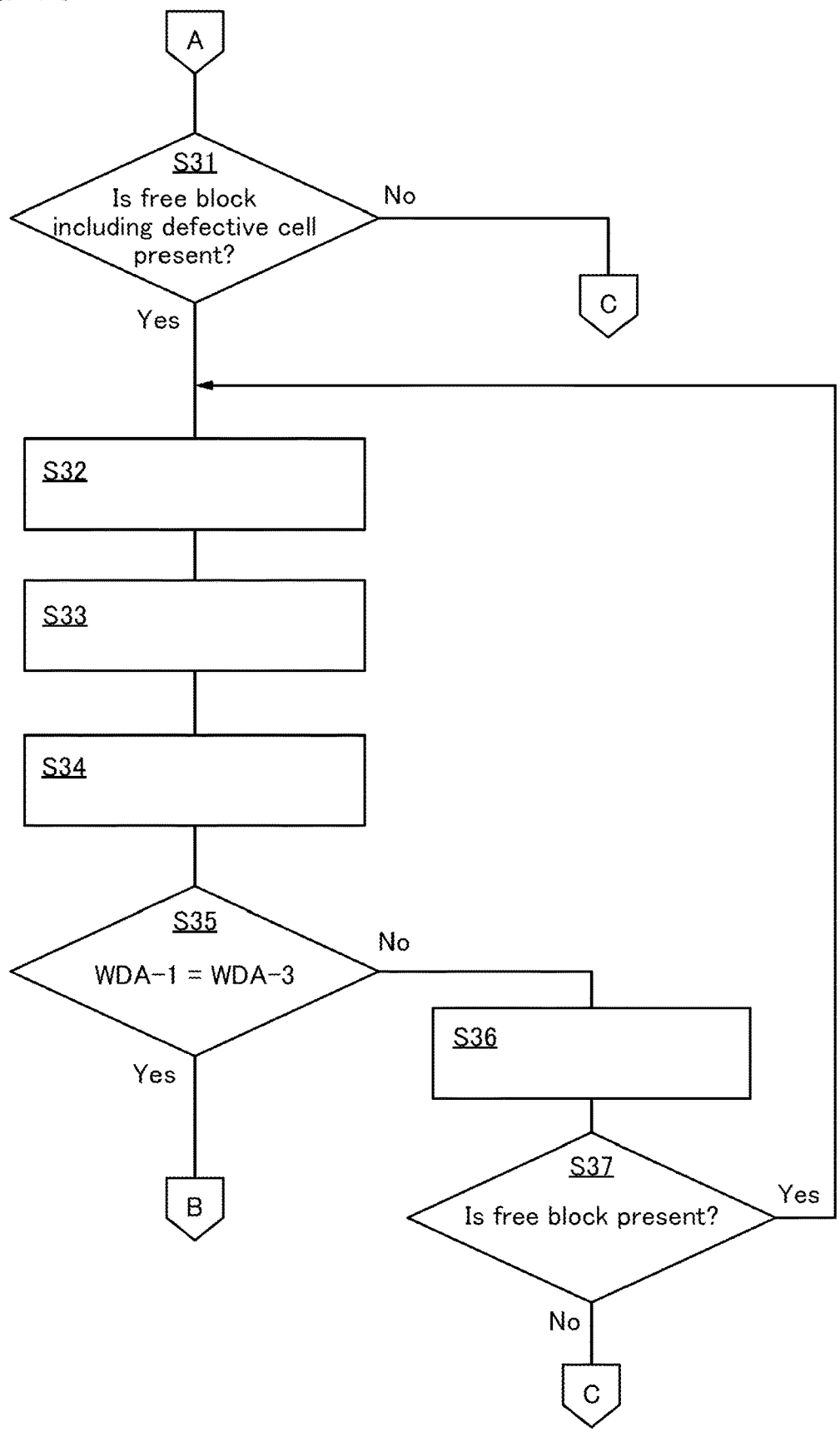
FIG. 10 is a flow chart illustrating an operation example of a memory device.

When a free block is present, the procedure returns to Step S22, and when no free block is present, the procedure proceeds to Step S31 (Connector A, see FIG. 10).

FIG. 10 shows a flow chart of Step S31 to Step S37. The flow chart in FIG. 10 explains an operation performed when a defective memory cell is present in each of the free blocks in the memory unit 120. A memory block 121 of error can be corrected is found out of the memory blocks 121 including defective memory cells, and data is saved in the memory block 121.

[Step S31]

In Step S31, it is checked whether a free memory block 121 including a defective memory cell is present (Yes) or not (No). Specifically, the control unit 112 accesses the free block management unit 114, and searches for the free memory block 121 including a defective memory cell with the free block management table 134. That is, the control unit 112 accesses the free block management table 134 and searches for a memory block for which the block FB has the first bit of "0" and the second bit of "1".

In the case where the applicable memory block is present, the procedure proceeds to Step S32. In the case where the applicable memory block is not present, the procedure proceeds to Step S51 (Connector C, see FIG. 11B). The memory block 121 found at this time is referred to as a memory block 121 [y].

[Step S32]

In Step S32, the data WDA-1 is written in the memory block 121[y]. Here, the data written in the memory block 121[y] is referred to as "data WDA-2".

The data WDA-1 that is transmitted from the host device 200 is temporarily written in the work memory 118.

[Step S33]

In Step S33, the data WDA-2 written in Step S32 is read out.

[Step S34]

In Step S34, by the ECC processing unit 116, error correction is performed on the data WDA-2 read out in Step S33. At this time, data corrected by the ECC processing unit 116 is referred to as data WDA-3.

[Step S35]

In Step S35, the control unit 112 determines whether the data WDA-3 corrected in Step S34 matches with the data WDA-1 temporarily saved in the work memory 118 (Yes) or not (No).

Figure 11A:
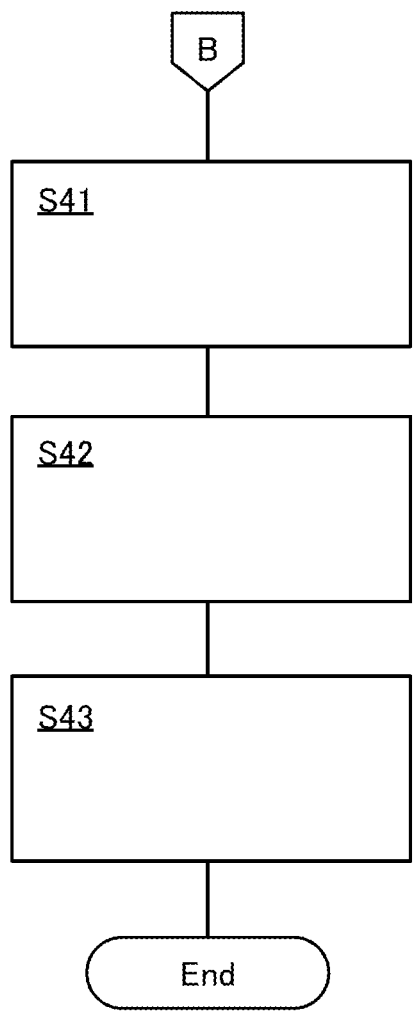
FIG. 11A and FIG. 11B are flow charts illustrating an operation example of a memory device.

In Step S35, when the data WDA-1 matches with the data WDA-3, the procedure proceeds to Step S41 (Connector B, see FIG. 11A). When the data WDA-1 does not match with the data WDA-3, Step S36 is performed.

[Step S36]

Step S36 is performed when the data WDA-1 does not match with the data WDA-2. In other words, in the case where error correction cannot be performed using the ECC processing unit 116, Step S36 is performed. In Step S36, "1" is written in the third bit of the block FB[x] of the free block management table 134 corresponding to the memory block 121[x]. As described above, the block FB in which "1" is stored in the third-bit is excluded from the search target of free blocks.

[Step S37]

In Step S37, it is checked whether a free memory block 121 including a defective memory cell is present (Yes) or not (No), as performed in Step S31. When another free block is present, the procedure returns to Step S32. When no other free block is present, Step S51 (Connector C, see FIG. 11B) is performed.

FIG. 11A is a flow chart of Step S41 to Step S43. FIG. 11A is a flow chart explaining an operation after the error check and correction is performed by the ECC processing unit 116.

[Step S41]

In Step S41, the control unit 112 accesses the ECC management unit 115 in the memory unit 120 and writes predetermined information in the ECC management table 135. Specifically, in the ECC management table 135, data "1" is written in a block ECCB[y] corresponding to the memory block 121[y].

[Step S42]

In Step S42, the control unit 112 accesses the address management unit 113 and the free-block management unit 114 and writes predetermined information in the logical address conversion table 133 and the free block management table 134. Specifically, in the logical address conversion table 133, the index information 141 of the logical address 140 that is transmitted from the host device 200 along with the data WDA-1 is written in a block AB[y] corresponding to the memory block 121[y], and in the free-block management table 134, data "1" is written in the first bit of a block FB[y] corresponding to the memory block 121[y].

Note that the procedure order of Step S41 and Step S42 is not limited to that in the flow chart of FIG. 11A. For example, the processing of Step S41 may be performed after the processing of Step S42. Step S41 and Step S42 may be concurrently performed.

[Step S43]

In Step S43, a signal that notifies the completion of writing of the data WDA-1 is transmitted to the host device 200 through the input/output unit 111.

Figure 11B:
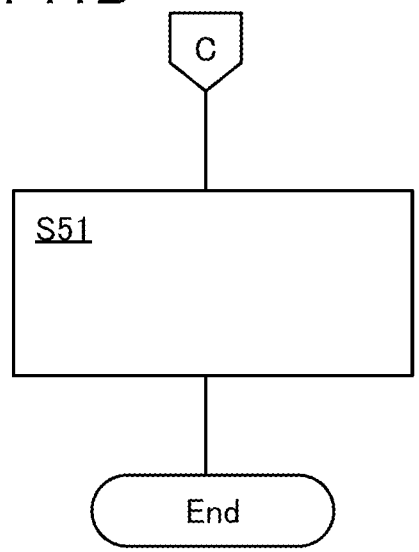

FIG. 11B is a flow chart including Step S51. Step S51 is an operation performed when no free block is found.

[Step S51]

In Step S51, a signal that notifies no write region for the data WDA-1 is transmitted to the host device 200 through the input/output unit 111.

<<Readout Operation>>

Figure 12:
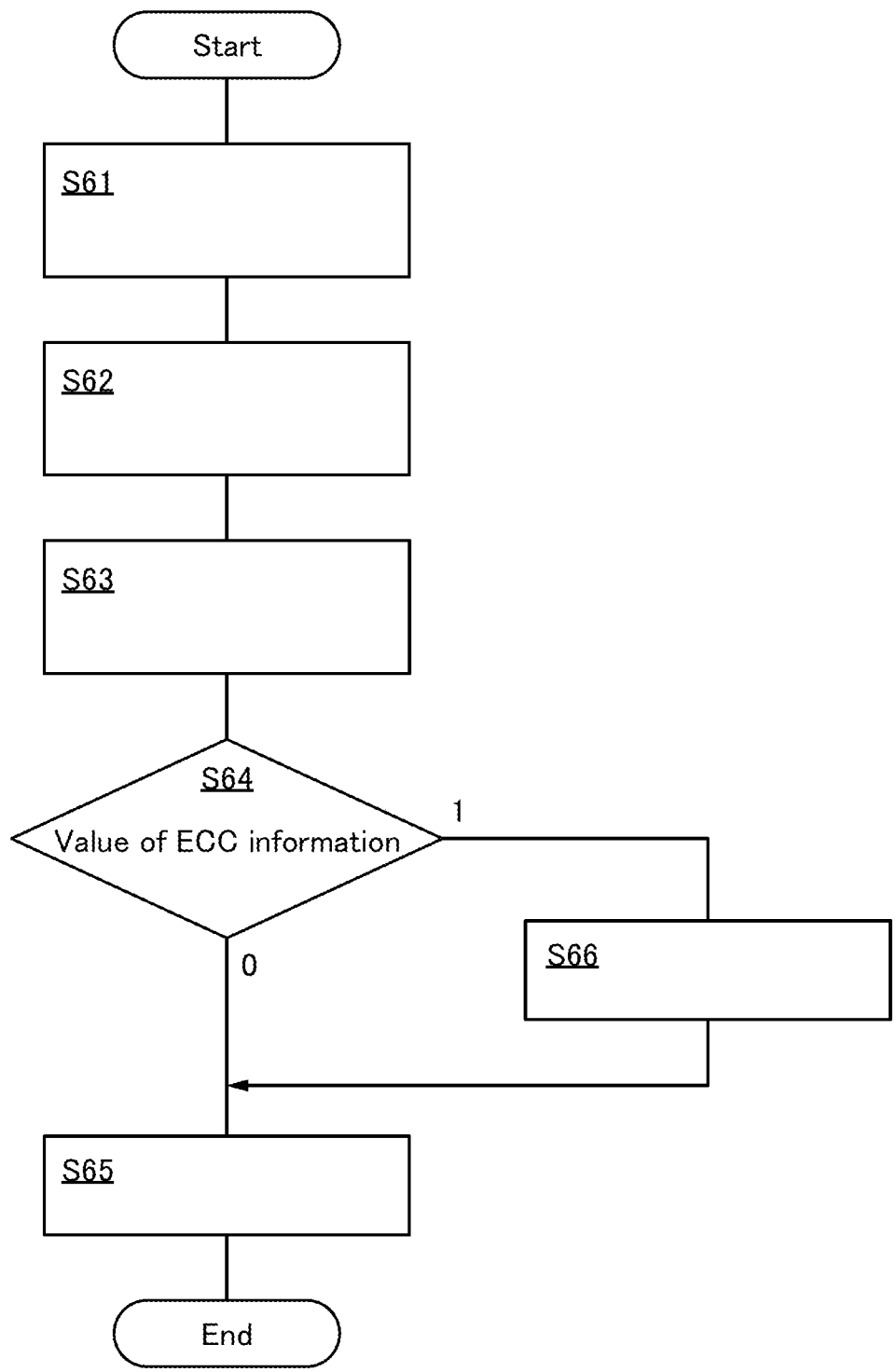
FIG. 12 is a flow chart illustrating an operation example of a memory device.

FIG. 12 is a flow chart explaining an operation example of the memory device 100 in response to the readout access from the host device 200. When a data readout request to the memory device 100 is made from the host device 200, the control unit 112 performs operations in Step S61 to Step S65. Here, data read from the memory device 100 is referred to as "data RDA-1".

[Step S61]

In Step S61, the control unit 112 calculates the physical address of the memory block 121 storing the data RDA-1 that is subject to a readout request from the host device 200, with use of the logical address conversion table 133 included in the address management unit 113. In this case, the memory block 121 storing the data RDA-1 is referred to as a memory block 121[z].

[Step S62]

In Step S62, the control unit 112 accesses the memory unit 120 and reads out the data RDA-1 stored in the memory block 121[z] at the physical address calculated in Step S61.

[Step S63]

In Step S63, the control unit 112 reads out information of the memory block 121[z] stored in the ECC management table 135 included in the ECC management unit 115 (the information is also referred to as "ECC information"). The ECC information "0" indicates that error correction is unnecessary and the ECC information "1" indicates that error correction is necessary.

[Step S64]

In Step S64, determination of the ECC information read out in Step S63 is performed. When the value of the ECC information is "0", the procedure proceeds to Step S65. When the value of the ECC information is "1", the procedure proceeds to Step S66.

[Step S66]

In Step S66, the control unit 112 accesses the ECC processing unit 116, and the ECC processing unit 116 performs error correction on the data RDA-1 read out in Step S61. In this case, data corrected by the ECC processing unit 116 is referred to as "data RDA-2". After that, the processing proceeds to Step S65.

[Step S65]

In Step S65, the readout data is transmitted to the host device 200 through the input/output unit 111. Specifically, when the procedure proceeds to Step S65 directly from Step S64, the memory device 100 transmits the data RDA-1 to the host device 200. When the procedure proceeds to Step S65 through Step S66, the memory device 100 transmits the data RDA-2 to the host device 200.

With one embodiment of the present invention, a highly reliable memory device can be provided. Furthermore, a memory device with high operation speed can be provided. Moreover, a memory device with low power consumption can be provided.

This embodiment can be implemented in an appropriate combination with the structures described in the other embodiments and the like.

Embodiment 2

In this embodiment, application examples of the semiconductor device using the memory device described in the above embodiment are described. The memory device described in the above embodiment can be applied to, for example, a variety of removable memory devices such as memory cards (e.g., SD cards), USB memories, and SSDs (solid state drives). FIG. 13A to FIG. 13E schematically show some structure examples of removable memory devices. The memory device described in the above embodiment is processed into a packaged memory chip and used in a variety of storage devices and removable memories, for example.

Figure 13A:
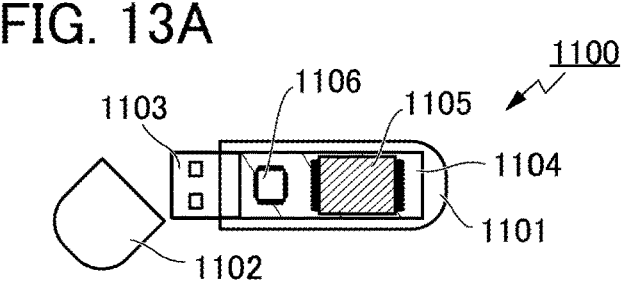
FIG. 13A to FIG. 13E are diagrams each illustrating an example of a memory device.

FIG. 13A is a schematic view of a USB memory. A USB memory 1100 includes a housing 1101, a cap 1102, a USB connector 1103, and a substrate 1104. The substrate 1104 is put in the housing 1101. The substrate 1104 is provided with a memory chip 1105 and a controller chip 1106, for example. The memory device described in the above embodiment can be incorporated in the memory chip 1105 or the like.

Figure 13B:
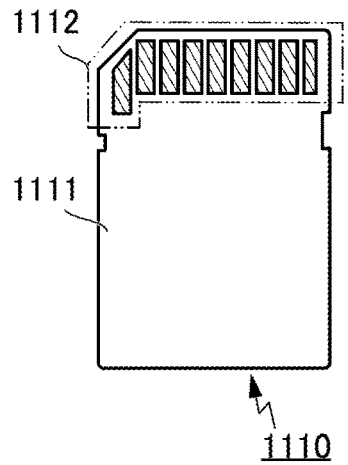
Figure 13C:
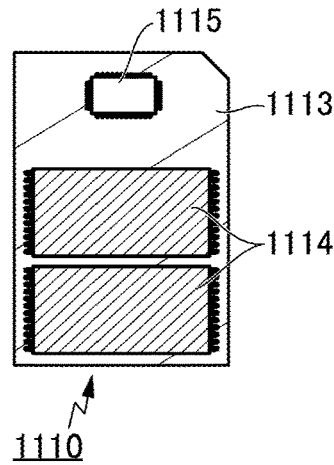

FIG. 13B is a schematic external view of an SD card, and FIG. 13C is a schematic view of the internal structure of the SD card. An SD card 1110 includes a housing 1111, a connector 1112, and a substrate 1113. The substrate 1113 is put in the housing 1111. The substrate 1113 is provided with a memory chip 1114 and a controller chip 1115, for example. When the memory chip 1114 is also provided on the back side of the substrate 1113, the capacity of the SD card 1110 can be increased. In addition, a wireless chip with a radio communication function may be provided on the substrate 1113. With this, data can be read from and written in the memory chip 1114 by radio communication between a host device and the SD card 1110. The memory device described in the above embodiment can be incorporated in the memory chip 1114 or the like.

Figure 13D:
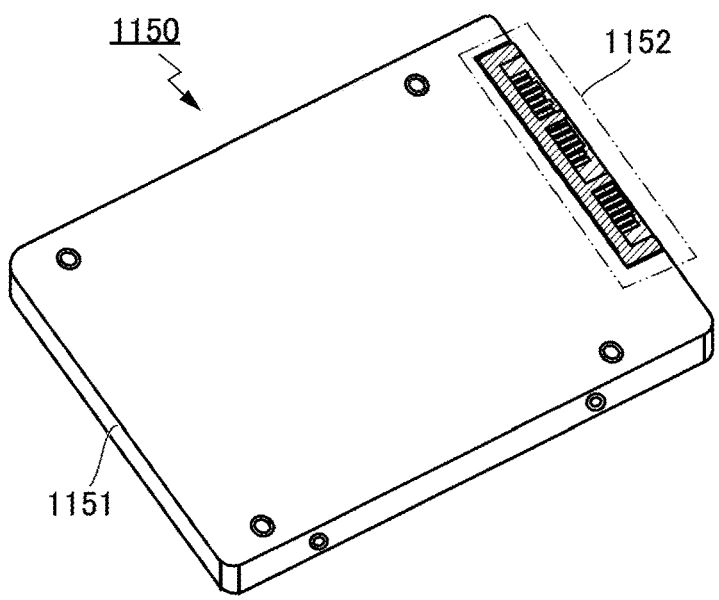
Figure 13E:
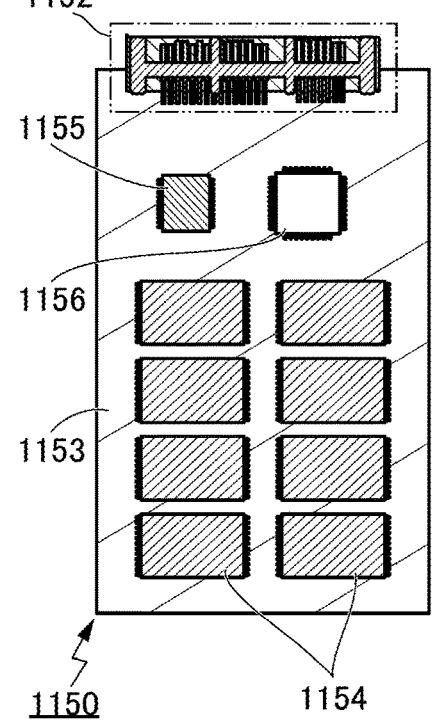

FIG. 13D is a schematic external view of an SSD, and FIG. 13E is a schematic view of the internal structure of the SSD. An SSD 1150 includes a housing 1151, a connector 1152, and a substrate 1153. The substrate 1153 is put in the housing 1151. The substrate 1153 is provided with a memory chip 1154, a memory chip 1155, and a controller chip 1156, for example. The memory chip 1155 is a work memory of the controller chip 1156, and a DOSRAM chip can be used, for example. When the memory chip 1154 is also provided on the back side of the substrate 1153, the capacity of the SSD 1150 can be increased. The memory device described in the above embodiment can be incorporated in the memory chip 1154 or the like.

This embodiment can be implemented in combination with any of the structures described in the other embodiments and the like, as appropriate.

Embodiment 3

In this embodiment, an information processing system in which the host device 200 is combined with the memory device 100 is described.

<Structure Example of Information Processing System>

Figure 14:
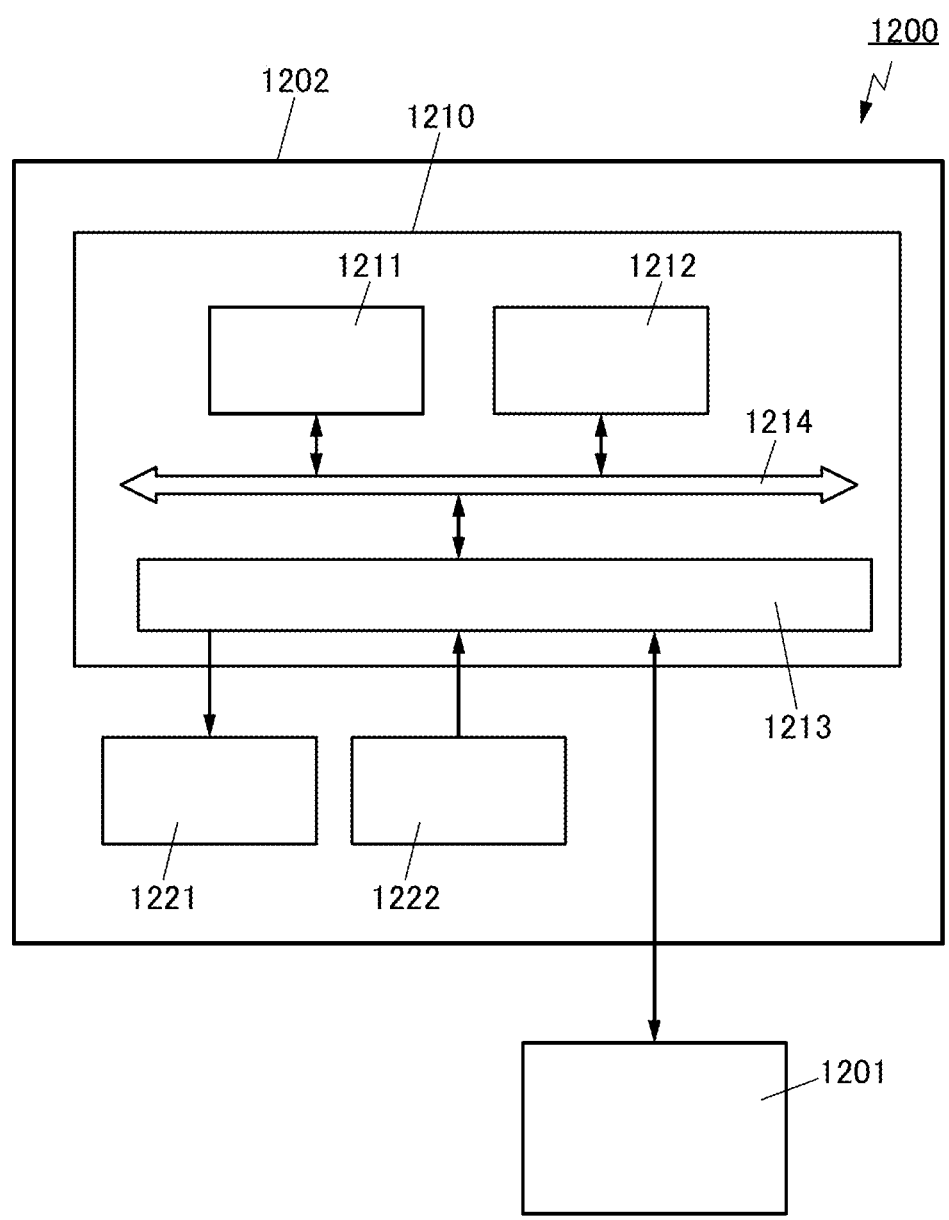
FIG. 14 is a block diagram illustrating a structure example of an information processing system.

FIG. 14 is a block diagram illustrating a structure example of an information processing system. An information processing system 1200 includes a memory device 1201 and a host device 1202. The memory device 100 described in the above embodiment can be used as the memory device 1201. The host device 1202 corresponds to the host device 200 described in the above embodiment.

The memory device 1201 is used as, for example, a storage device of the host device 1202 and has a function of storing data such as a program, image data, or audio data.

The host device 1202 includes a logic unit 1210, a display device 1221, and an input device 1222.

The logic unit 1210 has a function of controlling the entire host device 1202. The logic unit 1210 includes a processor 1211, a memory unit 1212, an interface 1213, and a bus 1214. The processor 1211, the memory unit 1212, and the interface 1213 are connected to one another through the bus 1214. The processor 1211 functions as an arithmetic unit and a control unit and has a function of controlling the entire operation of each device in the host device 1202 in accordance with a program such as firmware. A CPU, a microprocessor (MPU), or the like can be used as the processor 1211. The memory unit 1212 has a function of storing a program executed by the processor 1211, data processed by the processor 1211, or the like.

The logic unit 1210 communicates with the display device 1221, the input device 1222, and the memory device 1201 through the interface 1213. For example, an input signal from the input device 1222 is transmitted to the logic unit 1210 through the interface 1213 and the bus 1214.

The display device 1221 is provided as an output device and constitutes a display portion of the information processing system 1200. The host device 1202 may include another output device such as a speaker or a printer in addition to the display device 1221. Alternatively, the host device 1202 does not necessarily include the display device 1221.

The input device 1222 is a device for inputting data to the logic unit 1210. A user can operate the information processing system 1200 by operating the input device 1222. Various human interfaces can be used as the input device 1222, and the information processing system 1200 may include a plurality of input devices 1222.

A touch sensor, a keyboard, a mouse, an operation button, a microphone (an audio input device), a camera (an imaging system), or the like can be used as the input device 1222. A device that detects sound, eye movement, gesture, or the like is incorporated in the host device 1202, and the information processing system 1200 may be operated with the device. For example, in the case where a touch sensor is provided as the input device 1222, this touch sensor may be incorporated in the display device 1221.

In the information processing system 1200, the memory device 1201 and the host device 1202 may be put in one housing or may be formed using a plurality of devices connected to each other with or without a wire. For example, examples of the former include a laptop personal computer (PC), a tablet information terminal, an e-book reader, a smartphone, a cellular phone, an audio terminal, and a video recording/reproducing device. Examples of the latter include a set of a desktop PC, a keyboard, a mouse, and a monitor. In addition, for example, there are an audiovisual (AV) system that includes a video recording/reproducing device, an audio device (e.g., a speaker or an amplifier), and a television set, a monitor system that includes a surveillance camera, a display device, and a video recording memory device.

With the use of the memory device or the semiconductor device according to one embodiment of the present invention, an information processing system with higher operation speed can be provided. Furthermore, an information processing system with low power consumption can be provided.

This embodiment can be implemented in an appropriate combination with the structures described in the other embodiments and the like.

Embodiment 4

FIG. 15A to FIG. 15G illustrate examples of electronic devices each provided with the memory device of one embodiment of the present invention.

<Electronic Device System>

The memory device according to one embodiment of the present invention can be provided in a variety of electronic devices. Examples of electronic devices include an information terminal, a computer, a smartphone, an e-book reader, a television device, digital signage, a large game machine such as a pachinko machine, a digital camera, a digital video camera, a digital photo frame, a mobile phone, a portable game machine, a video recording/reproducing device, a navigation system, and an audio reproducing device. Here, the computers refer not only to tablet computers, notebook computers, and desktop computers, but also to large computers such as server systems.

The electronic device of one embodiment of the present invention may include an antenna. When a signal is received by the antenna, an image, information, or the like can be displayed on a display portion. When the electronic device includes the antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays).

The electronic device of one embodiment of the present invention can have a variety of functions. For example, the electronic device can have a function of displaying a variety of kinds of information (a still image, a moving image, a text image, and the like) on the display portion, a touch panel function, a function of displaying a calendar, date, time, and the like, a function of executing a variety of software (programs), a wireless communication function, and a function of reading out a program or data recorded in a recording medium.

[Information Terminal]

With the memory device of one embodiment of the present invention, a memory device for holding a microcontroller program can be obtained. Therefore, according to one embodiment of the present invention, an information terminal with improved operation speed and low power consumption can be provided.

Figure 15A:
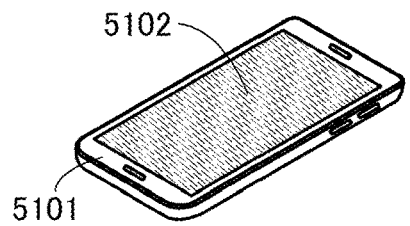
FIG. 15A to FIG. 15G are diagrams illustrating an example of an electronic device.

FIG. 15A illustrates a mobile phone (smartphone), which is a type of information terminal. An information terminal 5100 includes a housing 5101 and a display portion 5102. As input interfaces, a touch panel is provided in the display portion 5102 and a button is provided in the housing 5101. The memory device of one embodiment of the present invention may be used for storage of the mobile phone.

Figure 15B:
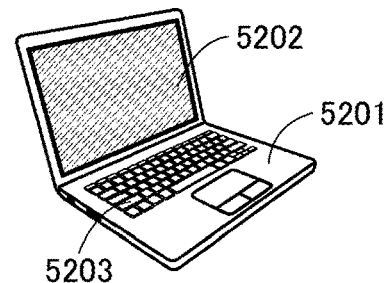

FIG. 15B illustrates a notebook information terminal 5200. The notebook information terminal 5200 includes a main body 5201 of the information terminal, a display portion 5202, and a keyboard 5203. The memory device of one embodiment of the present invention may be used for storage of the notebook information terminal.

Note that although FIG. 15A and FIG. 15B illustrate a smartphone and a notebook information terminal, respectively, as examples of the electronic device in the above description, an information terminal other than a smartphone and a notebook information terminal can be used. Examples of information terminals other than a smartphone and a notebook information terminal include a PDA (Personal Digital Assistant), a desktop information terminal, and a workstation.

[Game Machine]

Figure 15C:
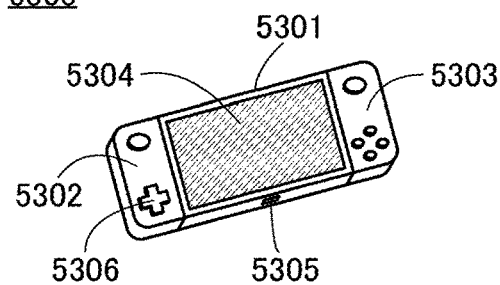

FIG. 15C illustrates a portable game machine 5300 as an example of a game machine. The portable game machine 5300 includes a housing 5301, a housing 5302, a housing 5303, a display portion 5304, a connection portion 5305, an operation key 5306, and the like. The housing 5302 and the housing 5303 can be detached from the housing 5301. When the connection portion 5305 provided in the housing 5301 is attached to another housing (not illustrated), an image to be output to the display portion 5304 can be output to another video device (not illustrated). In that case, the housing 5302 and the housing 5303 can each function as an operating unit.

Thus, a plurality of players can play a game at the same time. The memory device or the like of one embodiment of the present invention can be incorporated into a chip or the like provided on a substrate in the housing 5301, the housing 5302 and the housing 5303.

Figure 15D:
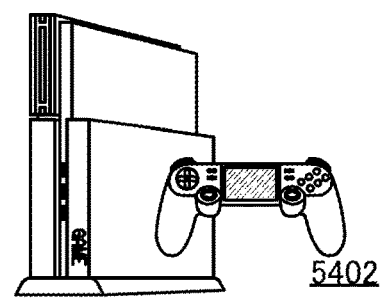

FIG. 15D illustrates a stationary game machine 5400 as an example of a game machine. A controller 5402 is wired or connected wirelessly to the stationary game machine 5400.

The memory device or the like of one embodiment of the present invention may be used in a game machine such as the portable game machine 5300 and the stationary game machine 5400.

Although the portable game machine and the stationary game machine are illustrated as examples of game machines in FIG. 15C and FIG. 15D, the game machine using the microcontroller of one embodiment of the present invention is not limited thereto. Examples of game machines using the microcontroller of one embodiment of the present invention include an arcade game machine installed in entertainment facilities (a game center, an amusement park, or the like) and a throwing machine for batting practice installed in sports facilities.

[Large Computer]

The memory device or the like of one embodiment of the present invention can be used in a large computer.

Figure 15E:
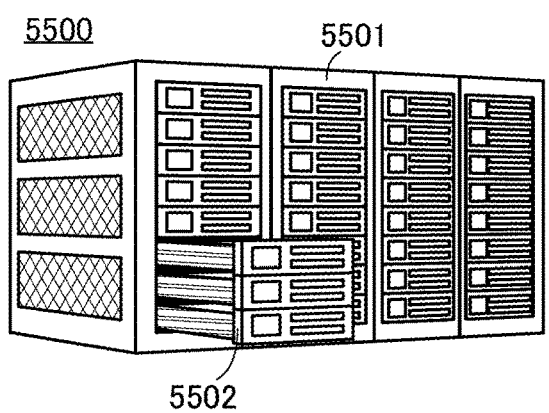
Figure 15F:
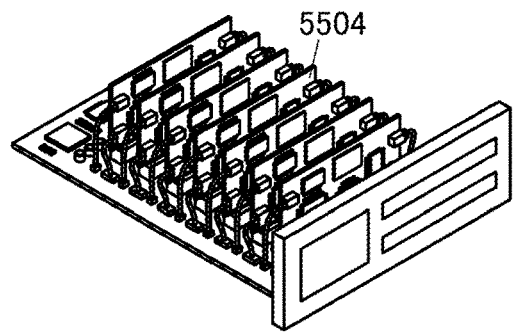

FIG. 15E is a diagram illustrating a supercomputer 5500 as an example of a large computer. FIG. 15F is a diagram illustrating a rack-mount computer 5502 included in the supercomputer 5500.

The supercomputer 5500 includes a rack 5501 and a plurality of rack-mount computers 5502. The plurality of computers 5502 are stored in the rack 5501. The computers 5502 are provided with a plurality of substrates 5504, and microcontrollers of one embodiment of the present invention can be mounted on the substrates. The memory device or the like of one embodiment of the present invention may be used for storage of the large computer.

Although FIG. 15E and FIG. 15F illustrate a supercomputer as an example of a large computer, a large computer according to one embodiment of the present invention is not limited thereto. Examples of a large computer according to one embodiment of the present invention include a computer that provides service (a server) and a large general-purpose computer (a mainframe).

[Household Appliance]

Figure 15G:
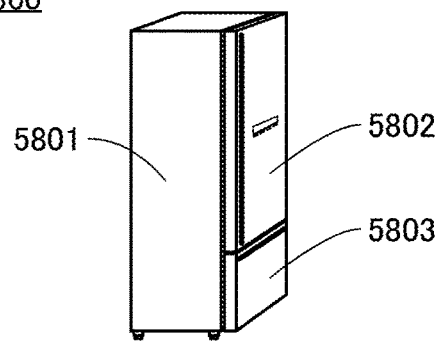

FIG. 15G illustrates an electric refrigerator-freezer 5800 as an example of a household appliance. The electric refrigerator-freezer 5800 includes a housing 5801, a refrigerator door 5802, a freezer door 5803, and the like.

The memory device or the like of one embodiment of the present invention can also be used for the electric refrigerator-freezer 5800. Other examples of household appliances include a vacuum cleaner, a microwave oven, an electric oven, a rice cooker, a water heater, an IH cooker, a water server, a heating-cooling combination appliance including an air conditioner, a washing machine, a drying machine, and an audio visual appliance.

With the use of the memory device according to one embodiment of the present invention, an electronic device with improved operation speed can be obtained. An electronic device with low power consumption can be provided.

This embodiment can be implemented in an appropriate combination with the structures described in the other embodiments and the like.

REFERENCE NUMERALS

100: memory device, 110: memory control unit, 111: input/output unit, 112: control unit, 113: address management unit, 114: free block management unit, 115: ECC management unit, 116: ECC processing unit, 117: firmware memory unit, 118: work memory, 120: memory unit, 121: memory block, 130: memory cell, 133: logical address conversion table, 134: free block management table, 135: ECC management table, 139: memory string, 140: logical address, 141: index information, 142: in-block offset information, 143: physical address, 151: memory cell, 152: FTJ element, 200: host device This application is based on Japanese Patent Application Serial No. 2020-158033 filed on Sep. 22, 2020, the entire contents are hereby incorporated herein by reference.

The invention claimed is:

1. A memory device comprising:
a memory control unit comprising an input/output unit, a control unit, and a first management unit; and
a memory unit comprising a plurality of memory blocks,
wherein the first management unit comprises a plurality of first memory elements,
wherein the control unit is configured to convert an address input through the input/output unit to an address of the memory block corresponding to the address, with use of a first management table retained in the plurality of first memory elements, and
wherein each of the plurality of first memory elements comprises a first transistor, a second transistor, and a first capacitor,
wherein the first capacitor comprises a ferroelectric layer,
wherein one of a source and a drain of the first transistor is electrically connected to a gate of the second transistor and to one electrode of the first capacitor, and
wherein the first transistor has a back gate, and the second transistor does not have a back gate.

2. The memory device according to claim 1,
wherein the memory control unit comprises a second management unit,
wherein the second management unit comprises a plurality of second memory elements,
wherein the control unit is configured to select a memory block in which data can be written, from the plurality of memory blocks, with use of a second management table retained in the plurality of second memory elements, and
wherein each of the plurality of second memory elements comprises a ferroelectric.

3. The memory device according to claim 1,
wherein the memory control unit comprises a third management unit,
wherein the third management unit comprises a plurality of third memory elements,
wherein the control unit is configured to determine whether error correction is necessary or not at the time of reading out data, with use of a third management table retained in the plurality of third memory elements, and
wherein each of the plurality of third memory elements comprises a ferroelectric.

4. The memory device according to claim 1,
wherein each of the plurality of memory blocks comprises a plurality of memory elements, and
wherein each of the plurality of memory elements is a NAND-type memory element.

5. The memory device according to claim 1,
wherein the ferroelectric comprises one or both of hafnium and zirconium.

6. The memory device according to claim 1,
wherein a concentration of hydrogen in the ferroelectric is $5\times10^{20}$ atoms/cm$^3$ or lower.

7. The memory device according to claim 1,
wherein a concentration of carbon in the ferroelectric is $5\times10^{19}$ atoms/cm$^3$ or lower.

* * * * *